United States Patent [19]
Maehara

[11] Patent Number: 5,964,324
[45] Date of Patent: Oct. 12, 1999

[54] DRUM BRAKE

[75] Inventor: Toshifumi Maehara, Saitama, Japan

[73] Assignee: Akebono Brake Industry Co., Ltd., Tokyo, Japan

[21] Appl. No.: 08/953,508

[22] Filed: Oct. 17, 1997

[30] Foreign Application Priority Data

| | | | |
|---|---|---|---|
| Oct. 18, 1996 | [JP] | Japan | 8-276571 |
| Dec. 27, 1996 | [JP] | Japan | 8-350926 |
| Mar. 6, 1997 | [JP] | Japan | 9-51855 |

[51] Int. Cl.⁶ ................................................ F16D 51/00
[52] U.S. Cl. .......................................................... 188/325
[58] Field of Search ............................. 188/325, 78, 362, 188/363, 364

[56] References Cited

U.S. PATENT DOCUMENTS

| | | | |
|---|---|---|---|
| 3,047,099 | 7/1962 | Dahle | 188/363 |
| 3,349,875 | 10/1967 | Stelzer | 188/78 |
| 4,503,954 | 3/1985 | Riquart et al. | 188/331 |

*Primary Examiner*—Robert J. Oberleitner
*Assistant Examiner*—Thomas J. Williams
*Attorney, Agent, or Firm*—Morgan, Lewis & Bockius LLP

[57] ABSTRACT

A wheel cylinder for expanding the opposed edges at one longitudinal end of a pair of brake shoes includes a pair of drive pistons for pressing the ends of the respective brake shoes under a hydraulic pressure supplied to the first pressure chamber, and a pair of control pistons which receive at the base ends the hydraulic pressure from the master cylinder and receive at the front ends anchor reaction force by way of levers, the control pistons being displaced to close a normally-open input control valve for supplying hydraulic pressure to the first pressure chamber when the anchor reaction force becomes larger than the hydraulic pressure received from the master cylinder by a predetermined magnifying power. Accordingly, it is possible to increase the stability of the braking effect of a duo-servo type drum brake.

9 Claims, 16 Drawing Sheets

DRUM BRAKE

BACKGROUND OF THE INVENTION

The present invention relates to a drum brake for a vehicle, or the like, and more particularly, to an improvement in a duo-servo type drum brake.

A drum brake used in a vehicle, or the like, generally comprises an input section (a wheel cylinder); brake shoes which expand in a drum so as to generate braking force upon receipt of force from the input section; and an anchor section for supporting the brake shoes.

Several types of conventional drum brakes, such as leading-trailing type drum brakes, two-leading type drum brakes, duo-servo type drum brakes, or the like, are used in general.

The leading-trailing type drum brake comprises a pair of opposed shoes, a wheel cylinder disposed between the opposed edges at one longitudinal end of the pair of shoes for expanding the shoes; and an anchor section disposed between the opposed edges at the other longitudinal end of the pair of shoes. In short, the leading-trailing type drum brake has a leading shoe and a trailing shoe incorporated therein.

The two-leading type drum brake has a pair of leading shoes incorporated therein. Of the two-leading type drum brakes, a single-acting two-leading type drum brake (TPLW) provides a large gain at the time of forward movement of the vehicle. In contrast, at the time of rearward movement of the vehicle, two trailing shoes are used to provide a comparatively smaller gain in comparison with the gain provided at the time of the forward travel. A double-acting two-leading type drum brake (TP2W) produces an equal amount of braking effect and provides a large gain for both forward and rearward movements of the vehicle.

The duo-servo type drum brake comprises a pair of shoes linked together. The braking force produced by the primary shoe is applied to the secondary shoe as input force, thereby effecting an equal amount of braking effect for both forward and rearward movements and resulting in a large gain.

However, the two-leading type drum brake requires two wheel cylinders, thereby rendering the drum brake expensive and a mechanism of a parking brake installed therein complicated.

In contrast, the duo-servo type drum brake has many advantages in comparison with the leading-trailing type drum brake or the two-leading type drum brake; for example, the advantages of considerably large braking effect, ease-of-miniaturization, and easy incorporation of a parking brake. On the other hand, for example, the duo-servo type drum brake is very sensitive to the frictional coefficient of a lining of the brake shoe or variations in the state of contact between the brake shoe and a rotary drum, thereby resulting in great variations in the braking effect and hence unstable braking characteristics.

In contrast, the leading-trailing type drum brake has superior stability and allows easy incorporation of a parking brake in comparison with the other two brakes. For this reason, in recent years, the leading-trailing type drum brake has become predominant.

The leading-trailing type drum brake produces a small amount of braking effect. To compensate for the deficiency of braking effect, a servo mechanism of the master cylinder or the diameter of the drum must be increased, which in turn makes it difficult to render the drum brake compact.

SUMMARY OF THE INVENTION

The present invention has been contrived in view of the foregoing drawbacks, and the object of the present invention is to provide a drum brake which produces a large amount of braking effect; which ensures superior stability of braking effect; and which enables easy incorporation of a parking brake, thereby realizing a compact servo mechanism for the master cylinder and the miniaturization and cost-cutting of a brake.

The foregoing object is accomplished by a duo-servo type drum brake, according to a first aspect of the present invention, including:

a cylindrical drum;

a pair of brake shoes including a primary shoe and a secondary shoe which are provided so as to face one another within the space of the cylindrical drum;

a wheel cylinder disposed between the opposed edges at one longitudinal end of the pair of brake shoes for expanding the brake shoes; and a link mechanism disposed between the opposed edges at the other longitudinal end of the pair of brake shoes and for transmitting an output of the primary shoe to the secondary shoe;

wherein the wheel cylinder further comprises:

a first pressure chamber;

a pair of drive pistons being opposite to each other with the first pressure chamber interposed therebetween, the pair of drive pistons pressing the ends of the respective brake shoes under a hydraulic pressure supplied to the first pressure chamber;

a second pressure chamber receiving a hydraulic pressure supplied from a master cylinder;

a normally-open input control valve provided in the second pressure chamber for opening and closing a fluid channel connecting the first pressure chamber and the second pressure chamber with each other;

a pair of control pistons provided in parallel with the pair of drive pistons in such a way that the base ends of the control pistons are opposite to each other with the second pressure chamber interposed therebetween, the pair of control pistons being displaced toward the second pressure chamber so as to close the normally-open input control valve when the pressing force exerted on the front ends of the control pistons becomes larger than the hydraulic pressure exerted on the base ends by a predetermined magnifying power; and lever members bridging the front ends of the drive and control pistons and applying an anchor reaction force transmitted to the drive pistons from the secondary shoe onto the front ends of the control pistons after having reduced it at a predetermined ratio.

When the drive pistons are actuated upon receipt of the hydraulic pressure from the master cylinder, the primary shoe and the secondary shoe are expanded and press the drum. At this time, if the braking effect is too large, and the anchor reaction force becomes larger than the input from the master cylinder by a predetermined factor, the control pistons are displaced under the anchor reaction force, thereby closing the normally-open input control valve. As a result, the hydraulic pressure supplied to the first pressure chamber between the drive pistons is constantly maintained. In contrast, if the braking effect decreases, the control pistons are reversely displaced upon receipt of the hydraulic pressure from the master cylinder, so that the normally-open input control valve is opened to thereby additionally supply the hydraulic pressure to the drive pistons. As a result, the wheel cylinder is capable of stably receiving the anchor reaction force that is larger than the input from the master cylinder by a predetermined magnifying power.

The above-mentioned duo-servo type drum brake may further comprise:

anchor pins each sandwiched between a plane surface on the front end of the drive piston and a circular-arch surface formed in the end of the respective brake shoes opposite to the plane surface for transmitting a pressing force therebetween, each of the anchor pins having a columnar shape and the axis aligned in the axial direction of the cylindrical drum.

In addition, in the above-mentioned duo-servo type drum brake, the second pressure chamber may be positioned in the vicinity of the center of the cylindrical drum in relation to the first pressure chamber.

Further, in the above-mentioned duo-servo type drum brake, each of the lever members may include:

at one end in the vicinity of the front end of the drive piston, a hemispherically concave reaction force receiving portion, with which the outer peripheral surface of the anchor pin displaced toward the drive piston by anchor reaction force comes into contact, and a convexly curved section which is positioned on the outside of the concave reaction force receiving portion in the radial direction of the cylindrical drum and is in rotatable contact with a cylinder body so as to function as a fulcrum about which each of the lever members turns; and at the other end in the vicinity of the front end of the control piston, a reaction force output portion which comes into contact with the front end surface of the control piston, in which the lever members applies the anchor reaction force transmitted to the drive pistons from the secondary shoe onto the front ends of the control pistons after having reduced the anchor reaction force at a predetermined ratio.

Furthermore, in the above-mentioned duo-servo type drum brake, each of the lever members may include:

at one end in the vicinity of the front end of the drive piston, a hemispherically concave reaction force receiving portion, with which the outer peripheral surface of the anchor pin displaced toward the drive piston by anchor reaction force comes into contact, and a convexly curved section which is positioned on the opposite side of the concave reaction force receiving portion with respect to the control chamber and is in rotatable contact with a cylinder body so as to function as a fulcrum about which each of the lever members turns; and at the other end in the vicinity of the front end of the control piston, a reaction force output portion which comes into contact with the front end surface of the control piston, in which the lever members apply the anchor reaction force transmitted to the drive pistons from the secondary shoe onto the front ends of the control pistons after having reduced the anchor reaction force at a predetermined ratio.

Still further more, in the above-mentioned duo-servo type drum brake, the wheel cylinder preferably comprises:

an auxiliary fluid chamber communicated with the first pressure chamber and formed around the outer peripheral surface of the control piston for opening and closing the control valve, the auxiliary fluid chamber being defined between a cylinder interior wall surface slidably supporting the control piston and the outer peripheral surface of the control piston.

In addition, in the above-mentioned duo-servo type drum brake, wherein the wheel cylinder may further comprise:

a stepped section for further increasing the volume of the auxiliary fluid chamber when the control piston is displaced toward the second pressure chamber.

In addition, the foregoing object can also be accomplished by a duo-servo type drum brake, according to a second aspect of the present invention, including a pair of brake shoes which are made up of a primary shoe and a secondary shoe and provided so as to face one another within the space of a cylindrical drum; a wheel cylinder disposed between the opposed edges at one longitudinal end of the pair of brake shoes for expanding the brake shoes; and a link mechanism which is disposed between the opposed edges at the other longitudinal end of the pair of brake shoes and inputs an output from the primary shoe to the secondary shoe, the duo-servo type drum brake being characterized by the fact that the wheel cylinder comprises a pressure chamber; a pair of drive pistons which are disposed so as to face one another with the pressure chamber between them and actuated back and forth toward the respective edges of the brake shoes under a hydraulic pressure supplied to the pressure chamber; anchor pins, each having a columnar shape and the axis aligned in the axial direction of the drum and serving as pressing force transmission means while being sandwiched between a plane surface on the front end of the drive piston and a circular-arch surface formed in the end of the brake shoe opposite to the plane surface; a control chamber which is positioned in the vicinity of the drum in relation to the pressure chamber and receives hydraulic pressure from the master cylinder; a normally-open input control valve which is provided in the control chamber and opens/closes a fluid channel connecting the pressure chamber to the control chamber; a pair of control pistons which are disposed in parallel with the pair of drive pistons in such a way that the base ends of the control pistons face each other with the control chamber between them, the control pistons being displaced toward the control chamber so as to close the control valve when the pressing force exerted on the front ends of the control pistons become larger than the hydraulic pressure exerted on the base ends of the control pistons by a predetermined magnifying power; and lever members, each having, at one end in the vicinity of the front end of the drive piston, a hemispherically concave reaction force receiving portion, with which the outer peripheral surface of the anchor pin displaced toward the drive piston by anchor reaction force comes into contact, and a convexly curved section which is positioned on the outside of the concave reaction force receiving portion in the radial direction of the cylindrical drum and is in rotatable contact with a cylinder body so as to function as a fulcrum about which the lever member turns or swing, each lever member having, at the other end in the vicinity of the front end of the control piston, a reaction force output portion which comes into contact with the front end surface of the control piston, the lever members applying the anchor reaction force transmitted to the drive pistons from the secondary shoe to the front ends of the control pistons after having reduced the anchor reaction force at a predetermined ratio.

With the foregoing arrangement, the control valve opens the fluid channel connecting the pressure chamber to the control chamber when the drum brake is in an inoperative state. If hydraulic pressure is supplied from the master cylinder by braking effect, the hydraulic pressure is immediately supplied to the pressure chamber.

If the hydraulic pressure is supplied to the pressure chamber via the control chamber as a result of the braking effect, the pair of drive pistons are pushed out of the pressure chamber, thereby pressing the edges of the primary and the secondary shoes via the anchor pins.

The brake shoes whose edges are pressed by the drive pistons are expanded and pressed against the drum, thereby producing braking force. At the time of the braking operation, anchor reaction force corresponding to the magnitude of the braking effect is transmitted to the drive pistons from the secondary shoe via the anchor pin. If the braking effect is increased and the anchor pin is pressed to a given extent or more by the anchor reaction force, the anchor pin presses one end of the lever member along with the drive piston.

The anchor reaction force transmitted to the lever member acts as the force for pushing back the control piston which is protruding under the pressure of the master cylinder. Accordingly, when the anchor reaction force becomes larger than the input from the master cylinder by a predetermined magnifying power, the control piston is pushed back by the anchor reaction force exerted on the control piston.

The control piston being pushed back by the anchor reaction force closes the normally-open control valve and holds the pressure chamber in a sealed state, thereby constantly maintaining the hydraulic pressure of the pressure chamber exerted on the drive pistons.

As described above, if there is a drop in the braking effect at the time of the braking effect while the pressure chamber is held in a sealed state, the anchor reaction force exerted on the control piston via the lever member is reduced. The control piston is again protruded by the hydraulic pressure received from the master cylinder, the control valve is opened again to thereby resume the supply of the hydraulic pressure to the pressure chamber.

As described above, since the control pistons control the supply of the hydraulic pressure to the pressure chamber according to the anchor reaction force, the wheel cylinder can stably receive the anchor reaction force that is larger than the input from the master cylinder by a predetermined magnifying power.

Further, in the construction according to the second aspect of the present invention, the end faces of the drive pistons for pressing the edges of the brake shoes via the anchor pins are formed into plane surfaces. The contact between the anchor pin and the drive piston and the contact between the anchor pin and the drive piston are realized by combination of a circumferential surface and a plane surface.

The foregoing object can be accomplished by a duo-servo type drum brake, according to a third aspect of the present invention, including a pair of brake shoes which comprises a primary shoe and a secondary shoe and provided so as to face one another within the space of a cylindrical drum; a wheel cylinder disposed between the opposed edges at one longitudinal end of the pair of brake shoes for expanding the brake shoes; and a link mechanism which is disposed between the opposed edges at the other longitudinal end of the pair of brake shoes and inputs an output from the primary shoe to the secondary shoe, the duo-servo type drum brake being characterized by the fact that the wheel cylinder comprises a pressure chamber; a pair of drive pistons which are disposed so as to face one another with the pressure chamber interposed therebetween and actuated back and forth toward the respective edges of the brake shoes under a hydraulic pressure supplied to the pressure chamber; anchor pins, each having a columnar shape and the axis aligned in the axial direction of the drum and serving as pressing force transmission means while being sandwiched between a planar surface formed in the end of the drive piston and a circular-arch surface formed in the end of the brake shoe; a control chamber which is separated from the pressure chamber and communicates with the master cylinder; a control valve which is provided in the control chamber and opens/closes a fluid channel connecting the pressure chamber to the control chamber; control pistons which are disposed in parallel with the pair of drive pistons in such a way that the base ends of the control pistons face each other with the control chamber interposed therebetween, the control pistons being displaced toward the control chamber so as to close the control valve when the pressing force exerted on the front ends of the control pistons become larger than the hydraulic pressure exerted on the base ends of the control pistons by a predetermined magnifying power; lever members, each having, at one end in the vicinity of the front end of the drive piston, a hemispherically concave reaction force receiving portion, with which the outer peripheral surface of the anchor pin displaced toward the drive piston by anchor reaction force comes into contact, and a convexly curved section which is positioned on the opposite side of the concave reaction force receiving portion with respect to the control chamber and is in rotatable contact with a cylinder body so as to function as a fulcrum about which the lever member turns or swings, each lever member having, at the other end in the vicinity of the front end of the control piston, a reaction force output portion which comes into contact with the front end surface of the control piston, the lever members applying the anchor reaction force transmitted to the drive pistons from the secondary shoe to the front end of the control piston after having reduced the anchor reaction force at a predetermined ratio; an auxiliary fluid chamber which communicates with the pressure chamber and is formed around the outer peripheral surface of the control piston for opening/closing the control valve between a cylinder interior wall surface slidably supporting the control piston and the outer peripheral surface of the control piston; and a stepped section for increasing the volume of the auxiliary fluid chamber when the control piston is displaced toward the control chamber.

With the foregoing arrangement, the control valve opens the fluid channel connecting the pressure chamber to the control chamber when the drum brake is in an inoperative state. If hydraulic pressure is supplied from the master cylinder by braking effect, the hydraulic pressure is immediately supplied to the pressure chamber.

If the hydraulic pressure is supplied to the pressure chamber via the control chamber as a result of the braking effect, the pair of drive pistons are pushed out of the pressure chamber, thereby pressing the edges of the primary and secondary shoes via the anchor pins.

The brake shoes whose edges are pressed by the drive pistons are expanded and pressed against the drum, thereby producing braking force. At the time of the braking operation, anchor reaction force corresponding to the magnitude of the braking effect is transmitted to the drive pistons from the secondary shoes via the anchor pin. If the braking effect is increased and the anchor pin is pressed to a given extent or more by the anchor reaction force, the anchor pin presses one end of the lever member along with the drive piston.

The anchor reaction force transmitted to the lever member acts as the force for pushing back the control piston which is protruding under the pressure of the master cylinder. Accordingly, when the anchor reaction force becomes larger than the input from the master cylinder by a predetermined magnifying power, the control piston is pushed back by the anchor reaction force exerted on the control piston.

The control piston pushed back by the anchor reaction force closes the normally-open control valve and holds the pressure chamber in a sealed state, thereby constantly maintaining the hydraulic pressure of the pressure chamber exerted on the drive pistons.

If there is a drop in the braking effect at the time of the braking effect while the pressure chamber is held in a sealed state, the anchor reaction force exerted on the control piston via the lever member is reduced. The control piston is again protruded by the hydraulic pressure received from the master cylinder, the control valve is opened again to thereby resume the supply of the hydraulic pressure to the pressure chamber.

As described above, since the control pistons control the supply of the hydraulic pressure to the pressure chamber according to the anchor reaction force, the wheel cylinder can stably receive the anchor reaction force that is larger than the input from the master cylinder by a predetermined magnifying power.

If the hydraulic pressure within the pressure chamber is increased by the control piston for any reasons (e.g., vibrations of a drum, etc.) while the pressure chamber is held in a sealed state to thereby maintain the hydraulic pressure, and if the pressing pressure exerted on the brake shoes from the drive pistons is increased, the braking effect is increased, thereby resulting in so-called variations in the braking effect.

However, in the wheel cylinder according to the present invention, if the hydraulic pressure within the pressure chamber is increased by the control piston for any reasons while the pressure chamber is held in a sealed state to thereby maintain the hydraulic pressure, and if the pressing pressure exerted on the brake shoe from the drive piston is increased, the anchor reaction force exerted on the control piston via the lever member is also increased at the same time. As a result, the control piston is pressed toward the control chamber, which in turn increases the volume of the auxiliary fluid chamber communicating with the pressure chamber. An increase in the volume of the auxiliary fluid chamber results in a substantial increase in the volume of the pressure chamber, thereby inhibiting an increase in the hydraulic pressure in the pressure chamber.

DETAILED DESCRIPTION OF THE PREFERRED EMBODIMENTS

With reference to the accompanying drawings, a drum brake in accordance with a first embodiment of the present invention will be described in detail herein below.

Figure 1:
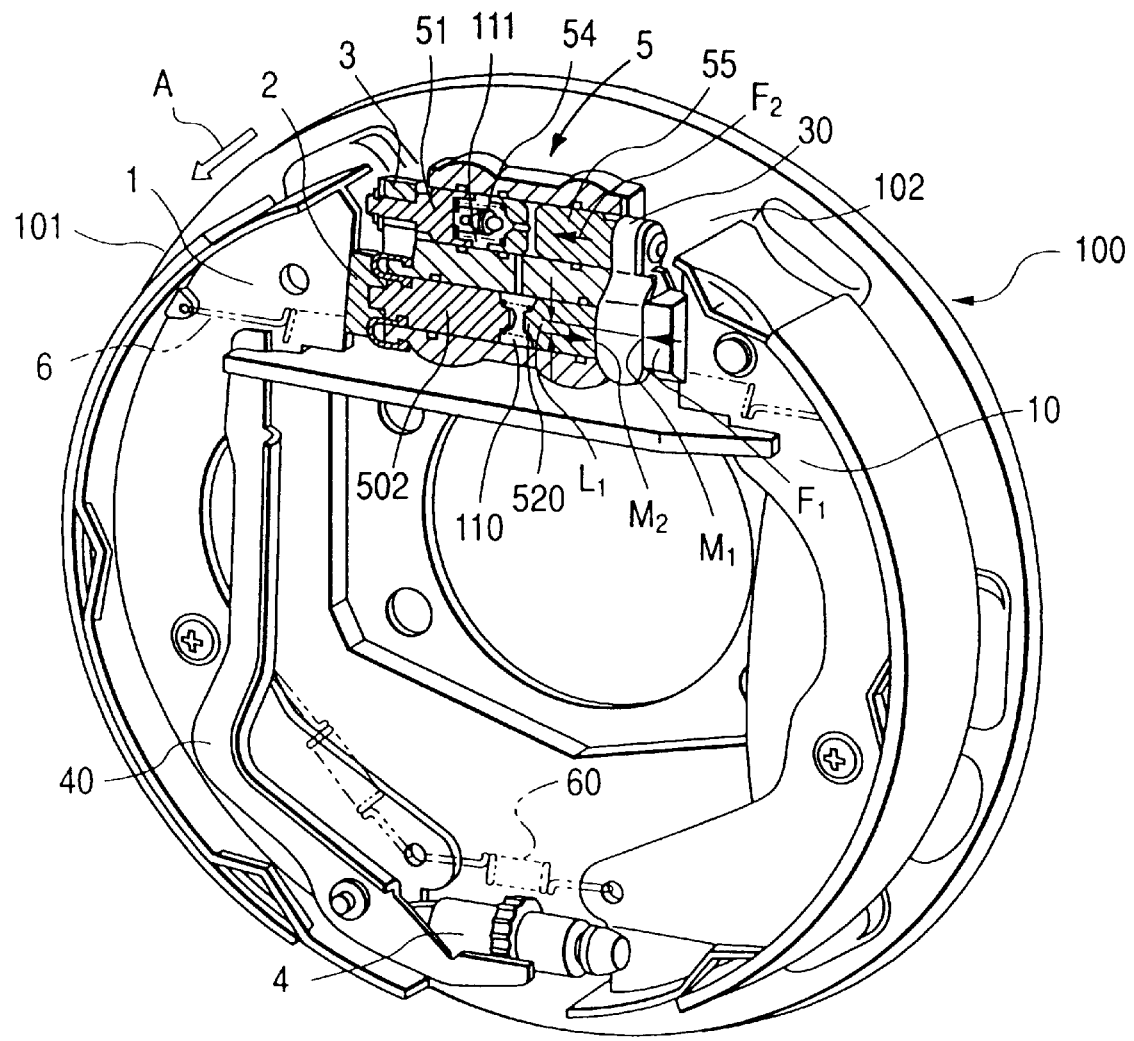
FIG. 1 is a partially cross-sectional perspective view showing a wheel cylinder of the drum brake.
Figure 2:
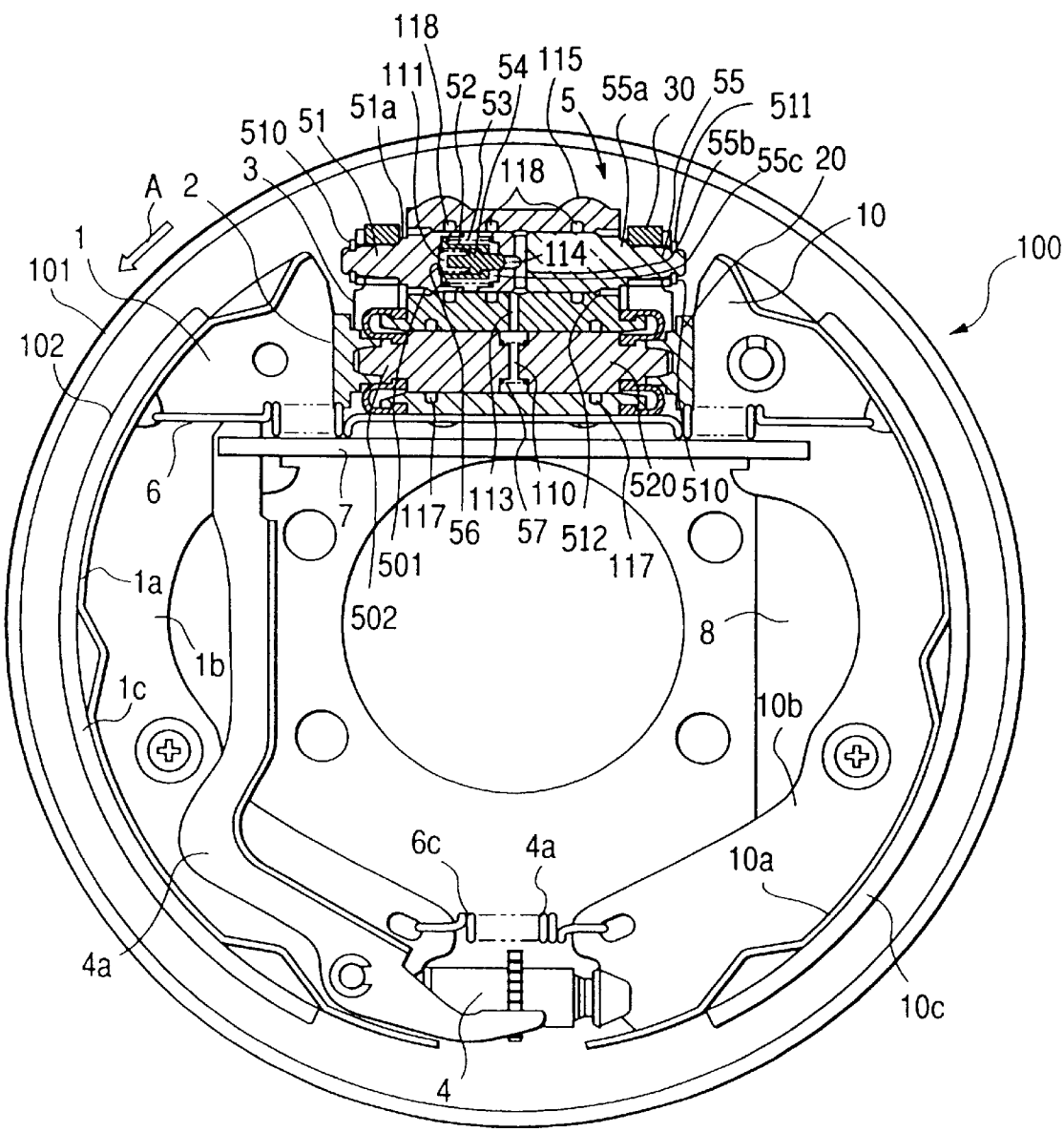
FIG. 2 is a front view showing the inoperative state of the drum brake.
Figure 3:
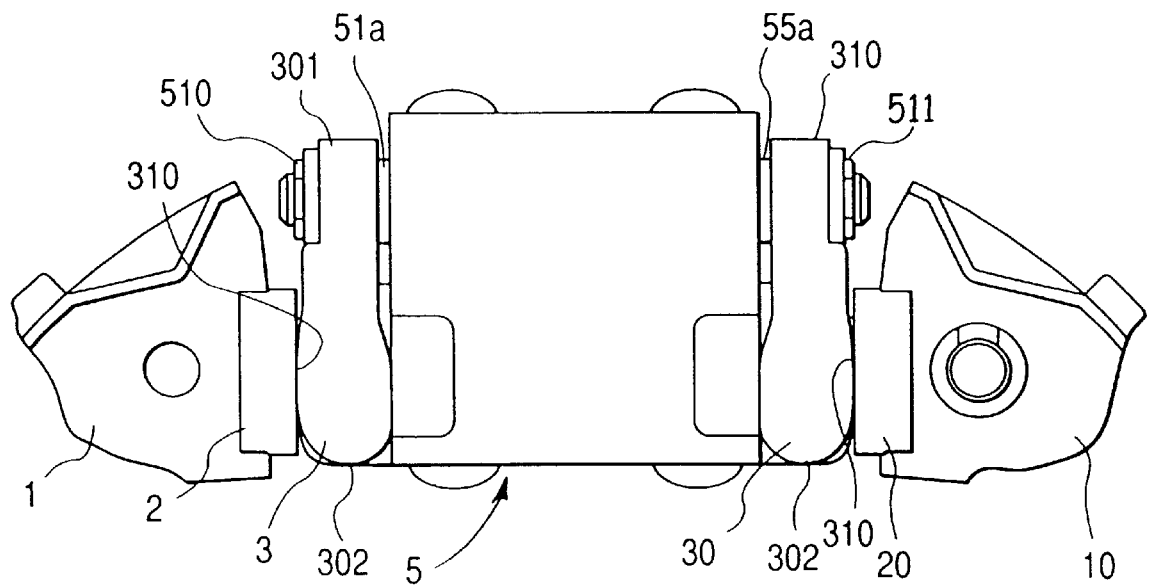
FIG. 3 is a front view showing the appearance of an area in the vicinity of the inoperative wheel cylinder in the drum brake.
Figure 4:
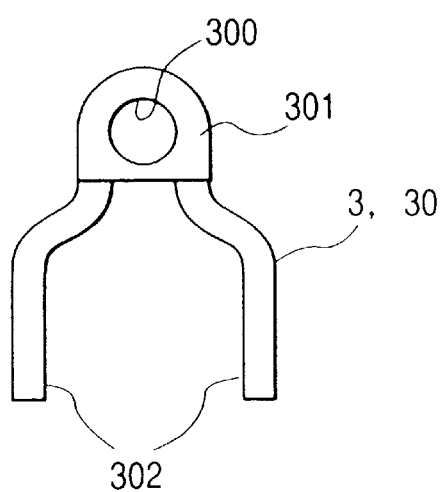
FIG. 4 is a front view showing a lever member used in this drum brake.
Figure 5:
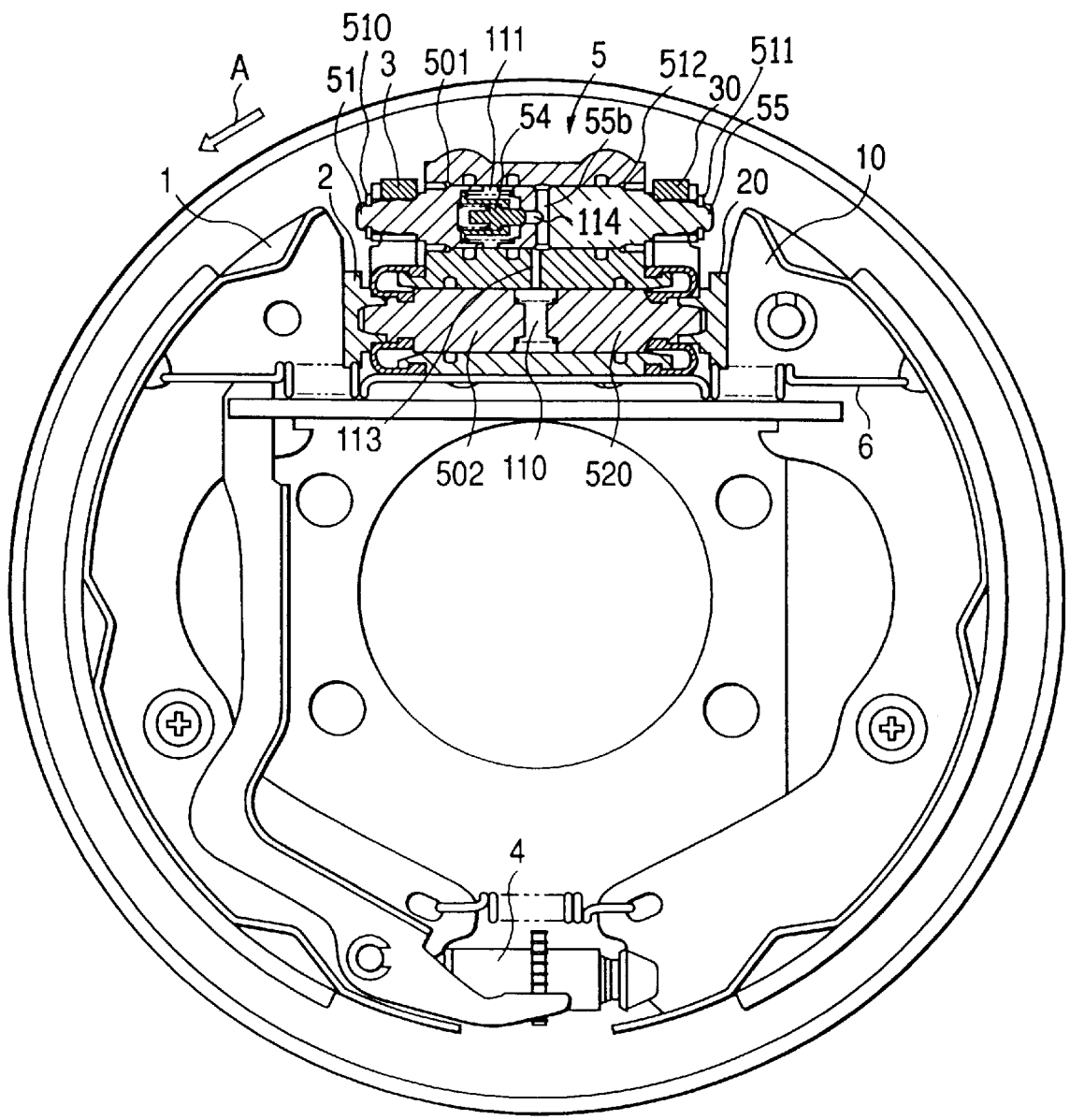
FIG. 5 is a front view showing an initial operating state of the drum brake.
Figure 6:
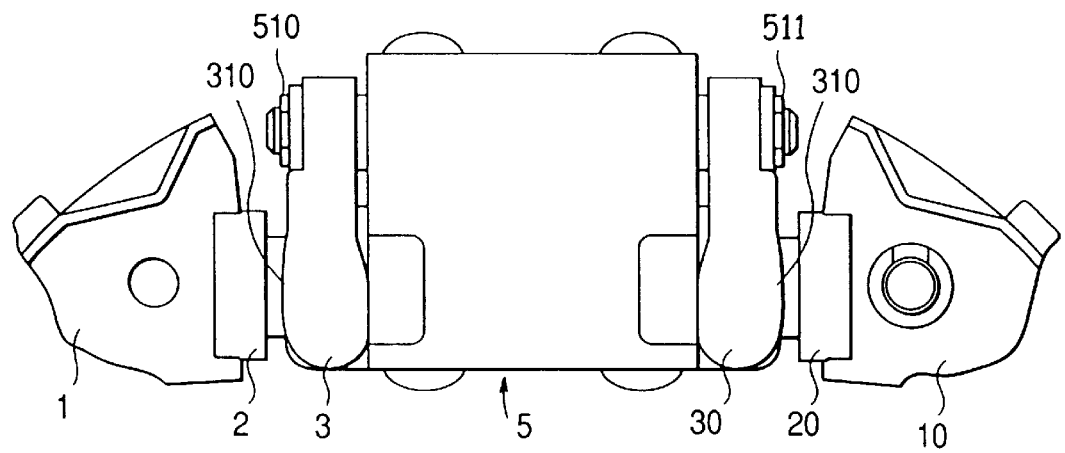
FIG. 6 is a front view showing the appearance of an area in the vicinity of the wheel cylinder in the initial operating state of the drum brake.
Figure 8:
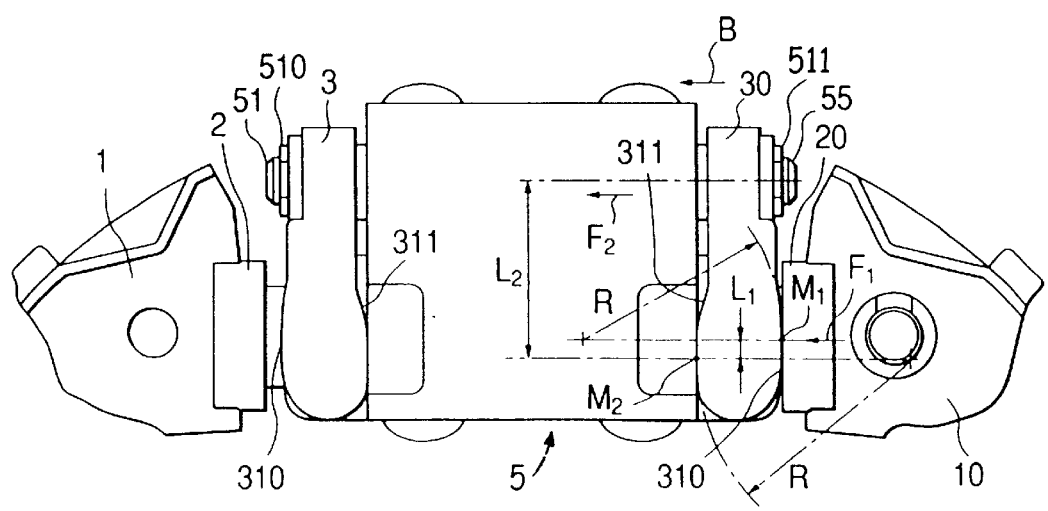
FIG. 8 is a front view showing the appearance of an area in the vicinity of the wheel cylinder when the anchor reaction force has exceeded a value which is larger than input pressure by a predetermined magnifying power.
Figure 7:
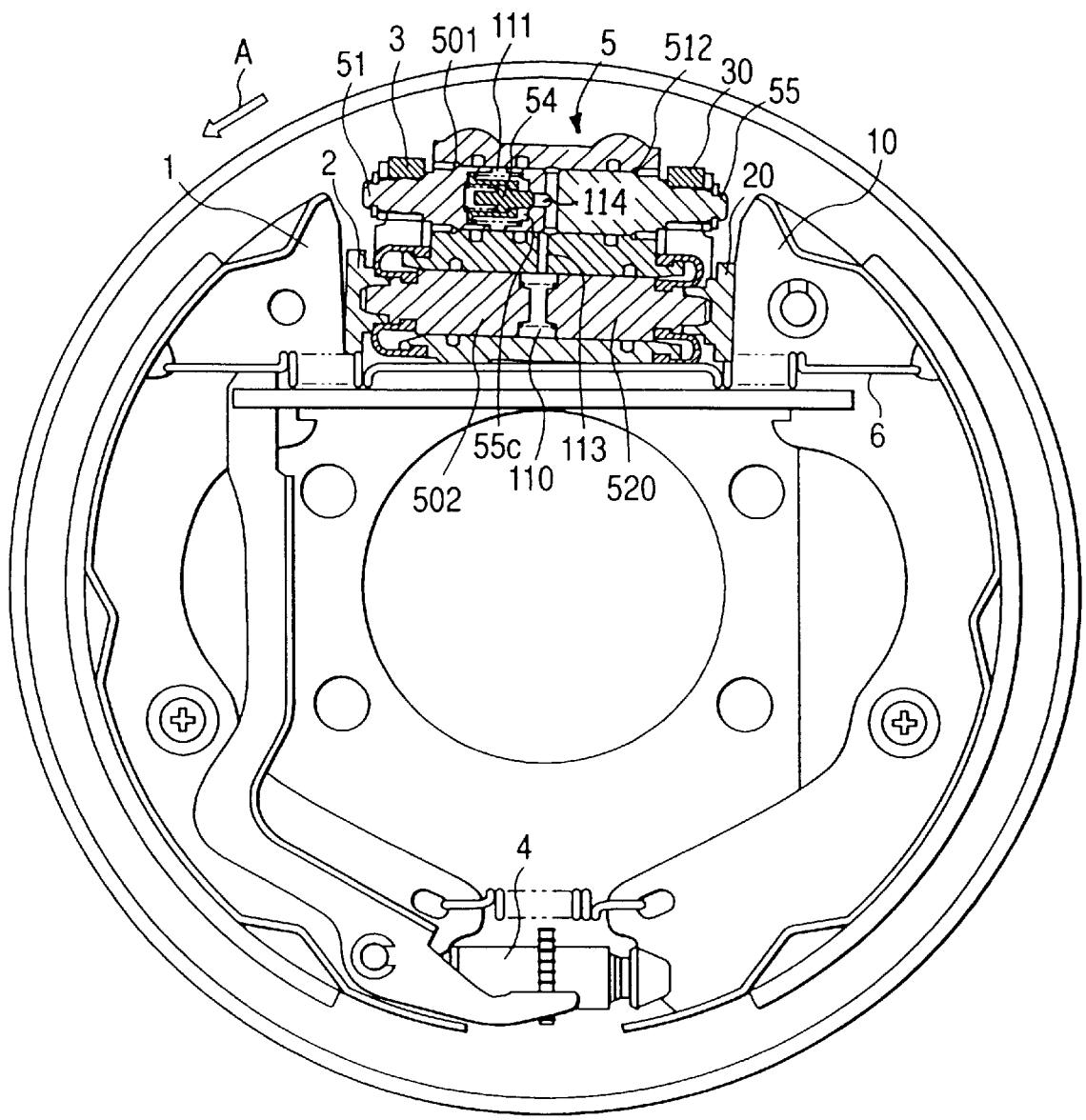
FIG. 7 is a front view showing the drum brake when anchor reaction force has exceeded a value which is larger than input pressure by a predetermined magnifying power.

FIGS. 1 through 8 illustrate a drum brake in accordance with a first embodiment of the present invention. FIG. 1 is a partially cross-sectional perspective view showing a wheel cylinder of the drum brake; FIG. 2 is a front view showing the inoperative state of the drum brake; FIG. 3 is a front view showing the appearance of an area in the vicinity of the inoperative wheel cylinder in the drum brake; FIG. 4 is a front view showing a lever member used in this drum brake; FIG. 5 is a front view showing an initial operating state of the drum brake; FIG. 6 is a front view showing the appearance of an area in the vicinity of the wheel cylinder in the initial operating state of the drum brake; FIG. 7 is a front view showing the drum brake when anchor reaction force has exceeded a value which is larger than input pressure by a predetermined magnifying power; and FIG. 8 is a front view showing the appearance of an area in the vicinity of the wheel cylinder when the anchor reaction force has exceeded a value which is larger than input pressure by a predetermined magnifying power.

A drum brake 100 is of so-called duo-servo type and comprises a pair of brake shoes 1, 10 which are disposed so as to be opposite to each other within an internal space of a cylindrical drum 101 and comprises a primary shoe 1 and a secondary shoe 10; a wheel cylinder 5 which is interposed between the opposed edges at one longitudinal end of the pair of brake shoes 1, 10 and expand the brake shoes 1, 10; an adjuster 4, as a linking mechanism, which is interposed between the opposed edges at the other longitudinal end of the pair of brake shoes 1, 10 and applies an output from the primary shoe 1 to the secondary shoe 10; and a backing plate 102 supporting these constituent members.

As shown in FIG. 2, the brake shoe 1 comprises a circular-arch plate-like rim 1a; a web 1b radially and inwardly extending from the rim 1a; and a lining 1c bonded to the outer periphery of the rim 1a. Similarly, the brake shoe 10 comprises a circular-arch plate-like rim 10a; a web 10b radially and inwardly extending from the rim 4a; and a lining 4c bonded to the outer periphery of the rim 10a. The brake shoes 1, 10 are attached to the backing plate 102 so as to advance to or recede from the internal peripheral surface of the drum 101.

The opposed edges on one longitudinal end of the pair of brake shoes 1, 10 are forced so as to approach each other (or to move away from the drum 101) by a return spring 6, and the opposed edges on the other longitudinal end of the pair of brake shoes 1, 10 are forced in a similar manner by a return spring 60.

As shown in FIG. 2, a strut 7 and a parking lever 8 constituting a parking brake are provided on the backing plate 102, and the pair of brake shoes 1, 10 can also be pressed against the drum 101 by the actuation of the parking lever 8.

The adjuster 4, as the linking mechanism, adjusts the space between the edges of the brake shoes 1 and 10 in accordance with the degree of wear of the linings 1c, 10c of the respective brake shoes 1, 10. An adjuster lever 40 abuts adjuster wheel 4a of the adjuster 4 by an adjuster spring (not shown). The space between the front ends of the brake shoes 1 and 10 is automatically adjusted by actuation of the adjuster lever 40.

In order to eliminate a drawback of the existing duo-servo type drum brake; i.e., a low degree of stability of braking effect, the wheel cylinder 5 is constituted as described below.

As shown in FIGS. 2 and 3, the wheel cylinder 5 comprises a pair of drive pistons 502, 520 which are provided so as to be opposite to each other with the first pressure chamber 110 interposed therebetween and press the end of each of the brake shoes 1, 10 by a hydraulic pressure which supplied to the first pressure chamber 110; a second pressure chamber 111 which receives a hydraulic pressure produced by the master cylinder (not shown) in response to the braking effect; a normally-open input control valve 54 which is disposed in the second pressure chamber 111 and opens/closes a fluid channel 113 connecting together the first and second pressure chambers 110, 111; a pair of control pistons 51, 55 which are disposed in parallel with the pair of drive pistons 502, 520 in such a way that the base ends of the control pistons 51, 55 are opposite to each other with the second pressure chamber 111 interposed therebetween, the pair of control pistons 51, 55 being displaced toward the second pressure chamber 111 so as to close the normally-open input control valve 54 when the pressing force exerted on the front ends of the control pistons becomes larger than the hydraulic pressure exerted on the base ends by a predetermined magnifying power; a cylinder 115 which supports the pair of control pistons 51, 55 and the pair of drive pistons 502, 520 in a slidable manner and provides the foregoing fluid channel 113 and the pressure chambers 110, 111; and lever members 3, 30 which bridge the front ends of the drive pistons 502, 520 and the front ends of the control pistons 51, 55 in parallel with the drive pistons 502, 520 and apply the anchor reaction force transmitted to the drive pistons 502, 520 from the secondary shoe to the front ends of the control pistons 51, 55 after having reduced it at a predetermined ratio.

The drive pistons 502, 520 are fluid-tightly and slidably supported by annular sealing members 117 fitted into a sealing grooves of the cylinder body 115. Plugs 2, 20 are each fitted into the respective front ends of the drive pistons 502, 520 which protrude from the cylinder body 115. The front ends of the drive pistons 502, 520 abut on the ends of the respective brake shoes 1, 10 via the plugs 2, 20.

In order to hold the front ends of the drive pistons 502, 520 in a pressed contact with the brake shoes 1, 10, a spring (compression spring) 57 for forcibly separating the drive pistons 502, 520 from each other is provided in the first pressure chamber 110 where the base ends of the drive pistons 502, 520 face one another.

The control pistons 51, 55 are fluid-tightly and slidably supported by annular sealing members 118 fitted into the sealing grooves of the cylinder body 115. The base ends of the control pistons 51, 55 are forced so as to separate from each other by a spring (compression spring) 52 provided in the second pressure chamber 111 and are positioned while abutting inner clips 501, 512 engagedly fitted around the cylinder body 115.

As shown in FIG. 5, the front ends of the control pistons 51, 55 abutting the outer clips 510, 511 protrude from the cylinder body 115 to merely a given length. The front ends of the control pistons 51, 55 protruding from the cylinder body 115 are joined to the respective front ends of the drive pistons 502, 520 disposed in parallel with the control pistons 51, 55.

As shown in FIG. 4, each of the levers 3, 30 comprises a reaction piston joint 301 having a fitting hole 300 which fittingly receives the front end of each of the reaction pistons 51, 55 and a bifurcated legs 302 which extends from the reaction piston joint 301 and fits around the front end of each of the drive pistons 502, 520.

As shown in FIG. 3, the control piston joints 301 are fitted around respective small-diameter portions of the front ends of the control pistons 51, 55. Further, one control piston joint 301 is sandwiched between a stepped section 51a of the small-diameter portion and a stop ring 510 engaged with the small-diameter portion of the control piston 51, and the other control piston joint 301 is sandwiched between a stepped section 55a and another stop ring 510 engaged with the small-diameter portion of the control piston 55. As a result of the control piston joints 301 being sandwiched between the stepped sections 51a, 55a and the corresponding stop rings 510, the control piston joints are displaced integrally together with the control pistons 51, 55 in response to their axial displacements.

The legs 302 of the levers 3, 30 are fitted around the respective front ends of the drive pistons 502, 520 so as to be slidable in the axial direction of the drive pistons 502, 520.

Further, as shown in FIG. 8, each of the legs 302 has a curved surface 310 and a curved surface 311. When the plugs 2, 20 provided at the respective front ends of the drive pistons 502, 520 are pressed by the anchor reaction force, the plugs 2, 20 come into collision with the respective curved surfaces 310, and the curved surfaces 311 come into collision with the respective end faces of the cylinder body 115.

As shown in FIG. 8, the center of curvature of the curved surface 310 is offset from the center of curvature of the curved surface 311 by a mere distance L1 in the lengthwise direction of the leg 302 (i.e., in the lengthwise direction of the lever). As a result of the offset between the centers of curvature, a point of contact M1 between the curved surface 310 and the plugs 2, 20 is offset from a point of contact M2 between the curved surface 311 and the cylinder body 115 by a mere distance L1.

The point of contact M2 serves as a fulcrum about which a lever turns or swings, whereas the point of contact M1 serves as a point on which the secondary shoe exerts the anchor reaction force. Therefore, as shown in FIGS. 1 and 8, taking the distance between the point of contact M2 and the reaction pistons 51, 55 as L2 and the anchor reaction force exerted on the point of contact M1 as F1, the anchor reaction force F2 transmitted to each of the control pistons 51, 55 via the levers 3, 30 is reduced compared with the anchor reaction force F1 by a ratio (so called as a leverage) of L1/L2. Accordingly, the pressure receiving diameter of each of the reaction pistons 51, 55 can be reduced.

Suppose that the drum 101 is rotatably driven in the direction designated by an arrow A shown in the drawing when the vehicle forwardly travels, the lever 30 transmits the anchor reaction force received from the secondary shoe 10 to the control piston 55 at the time forward travel of the vehicle. The lever 3 transmits the anchor reaction force received from the primary shoe 1 serving as a secondary shoe at the time of reverse travel of the vehicle to the control piston 51.

Turning again to FIG. 2, a fluid channel 55b which connects the second pressure chamber 111 to the fluid channel 113 and a valve seat 55c for opening/closing the fluid channel 55b by the input control valve 54.

The input control valve 54 is forced toward the valve seat 55c by a valve spring 56. In order to prevent the input control valve 54 from being placed in the valve seat 55c when the control pistons 51, 55 are in an inoperative position (i.e., a position where the pistons abut the clips 501, 510), there is provided a stopper (not shown) for limiting the location of the input control valve 54 at a position spaced only a required distance apart from the valve seat 55c.

A spring seat 53 is provided between the spring 52 for forcing the control pistons 51, 55 and the valve spring 56 for forcing the input control valve 54 in order to prevent mutual interference between these springs.

In the foregoing drum brake 100, as shown in FIGS. 2 and 3, the pair of control pistons 51, 55 are held in a stationary position by the outer clips 510, 511. The pair of drive pistons 502, 520 are held in close proximity to each other by the urging force of each of the return springs 6, 60 exerted on the first pressure chamber 110.

Further, as shown in FIG. 3, the plugs 2, 20 provided at the respective front ends of the drive pistons 502, 520 are held in contact with the respective curved surfaces 310 of the levers 3, 30.

As shown in FIGS. 5 and 6, when braking effect is commenced, the hydraulic pressure supplied from the master cylinder is supplied to the first pressure chamber 110 via the second pressure chamber 111 and the fluid channels 55b, 113, thereby pushing the pair of drive pistons 502, 520. The thus-pushed pair of drive pistons 502, 520 press the respective ends of the brake shoes 1, 110 via the plugs 2, 20 to thereby press the brake shoes 1, 10 against the inner circumferential surface of the drum 101.

As shown in FIG. 6, if the pair of drive pistons 502, 520 are pushed at the time of commencement of the braking effect, the plugs 2, 20 provided at the respective front ends of the drive pistons 502, 520 are brought out of contact with the respective curved surfaces 310 of the levers 3, 30.

When the brake shoes 1, 10 are pushed by the drive pistons 502, 520 and are brought into contact with the inner peripheral surface of the drum 101, the brake shoes 1, 10 move in the direction of rotation of the drum (i.e., in the direction designated by arrow A in FIGS. 1, 2, 5, and 7) by the servo action. The drive piston 520 is pushed back toward the first pressure chamber 110 by the anchor reaction force applied to the drive piston 520 from the secondary shoe 10 via the plug 20. As a result, as shown in FIG. 8, the plug 20 comes into contact with the curved surface 310 of the lever 30.

In response to such an action of the drive piston 520, the drive piston 502 pushes the plug 2 further, so that the drive piston 502 further protrudes from the cylinder body 115.

If there is large servo action, and the anchor reaction force input to the drive piston 520 from the secondary shoe 10 becomes greater than the reaction force determined by the hydraulic pressure of the second pressure chamber 111 and the ratio (so called as a leverage) between the levers 3, 30, the lever 30 pivots in the direction designated by an arrow B shown in FIG. 8 by the anchor reaction force received from the secondary shoe 10, thereby pushing back the control piston 55 toward the second pressure chamber 111. The input control valve 54 is then placed in the valve seat 55c of the control piston 55 to thereby close the fluid channel 113 through which the hydraulic pressure is supplied to the first pressure chamber 110. As a result, the first pressure chamber 110 is held in a hermetic state, and hence the braking force at this point in time is kept maintained.

In this state, if the hydraulic pressure is further supplied to the second pressure chamber 111 from the master cylinder by the braking effect, the hydraulic pressure within the second pressure chamber 111 is increased, thereby pushing the control piston 55. As a result, the input control valve 54 is brought away from the valve seat 55c of the reaction piston 55.

Accordingly, the input control valve 54 opens the fluid channel 114, and the hydraulic pressure within the second pressure chamber 111 is supplied to the first pressure chamber 110 to thereby increase the hydraulic pressure within the first pressure chamber 110. As a result, the pair of drive pistons 502, 520 push the brake shoes 1, 10 further, thereby resulting in an increase in braking force.

The drum brake 110 in the foregoing embodiment is basically a duo-servo type drum brake, and therefore the advantages of the duo-servo type drum brake; e.g., the advantages of a high degree of braking effect and easy incorporation of a parking brake, are ensured, exactly as they are.

In the thus-contrived wheel cylinder 5, when the anchor reaction force of the secondary shoe 10 becomes larger than the input from the master cylinder by a predetermined magnifying power, the control piston 55 that receives at the front end the anchor reaction force via the lever 30 is displaced toward the second pressure chamber 111, thereby closing the input control valve 54 that opens/closes the fluid channel 113 connecting the master cylinder to the first pressure chamber 110. As a result, the hydraulic pressure exerted on the pair of drive pistons 502, 520 that press the primary and secondary shoes 1, 10 is constantly held.

Accordingly, the anchor reaction force that is larger than the input by a predetermined magnifying power can be stably obtained, thereby eliminating the serious disadvantage of the existing duo-servo type drum brake; i.e., the disadvantage of instable braking effect.

The duo-servo type drum brake according to the present invention provides a high degree of braking effect and realizes stable braking effect and easy incorporation of a parking brake. Miniaturization of a servo mechanism of the master cylinder enables a reduction in the size and cost of the brake.

In the foregoing construction, a servo ratio at which the input control valve 54 is actuated can be set to an arbitrary value by changing the pressure-receiving areas of the control pistons 51, 55 facing the second pressure chamber 111 and the ratio (so called as a leverage) between the levers 3, 30 which transmit the anchor reaction force to the control pistons 51, 55. Therefore, engineering changes can be readily made to braking characteristics according to the type of a vehicle.

The levers 3, 30 can input the anchor input received from the brake shoes to the respective drive pistons 51, 55 after having considerably reduced the input. In other words, the pressure-receiving areas of the control pistons 51, 55 facing the second pressure chamber 111 can be considerably reduced by setting the ratio (so called as a leverage) between the levers 3, 30, as required. The miniaturization of the control pistons 51, 55 makes it possible to render the wheel cylinder 5 or more easily make the drum bake compact.

In the foregoing construction, the pair of control pistons 51, 55 are provided so as to face one another with the second pressure chamber 111 between them, and the levers 3, 30 are engaged with the control pistons 51, 55, whereby braking characteristics corresponding to the anchor reaction force when the vehicle travels forward or rearward. If there is no need to take into consideration the servo action performed at the time of rearward travel of the vehicle, the control piston 51 and the lever 3 can be omitted.

Hereinafter, a drum brake according to a second embodiment of the present invention will be described in detail with reference to the drawings.

Figure 9:
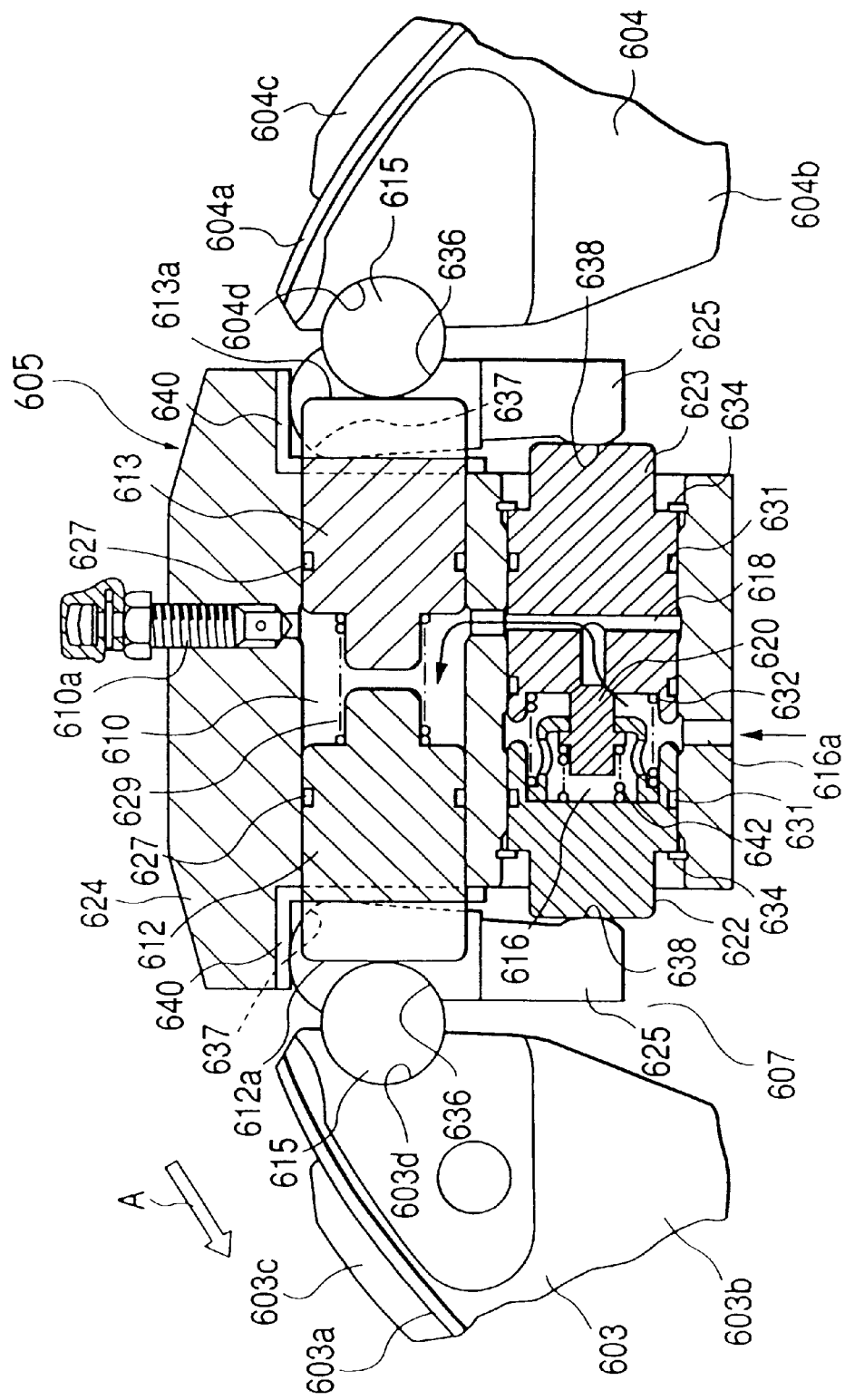
FIG. 9 is a cross-sectional view showing the principal elements of the drum brake while the drum brake is in an inoperative state.
Figure 9B:
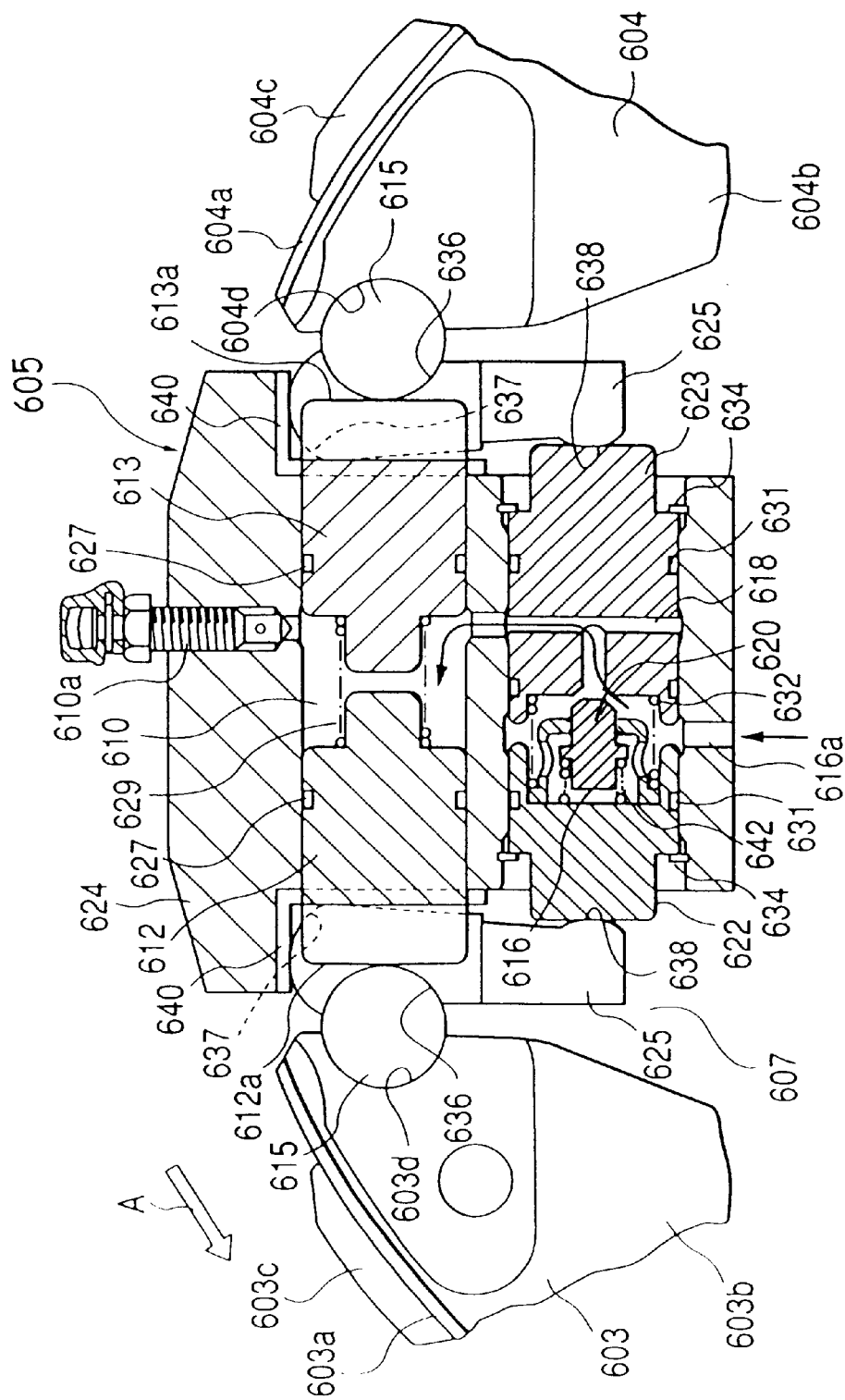
FIG. 9b is a view showing the input control valve in the inoperative state.
Figure 10:
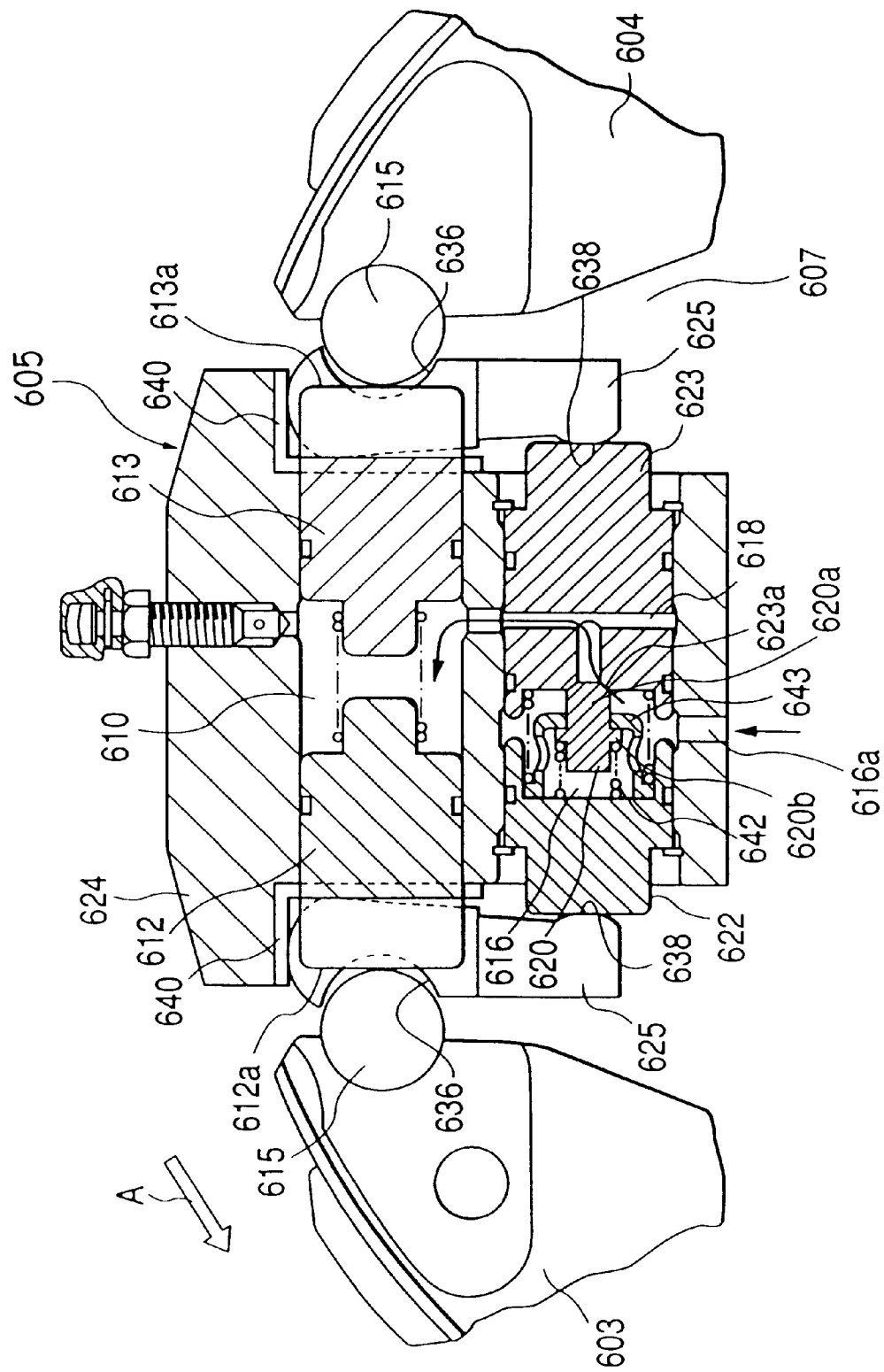
FIG. 10 is a perspective view schematically showing the configuration of the drum brake.
Figure 11:
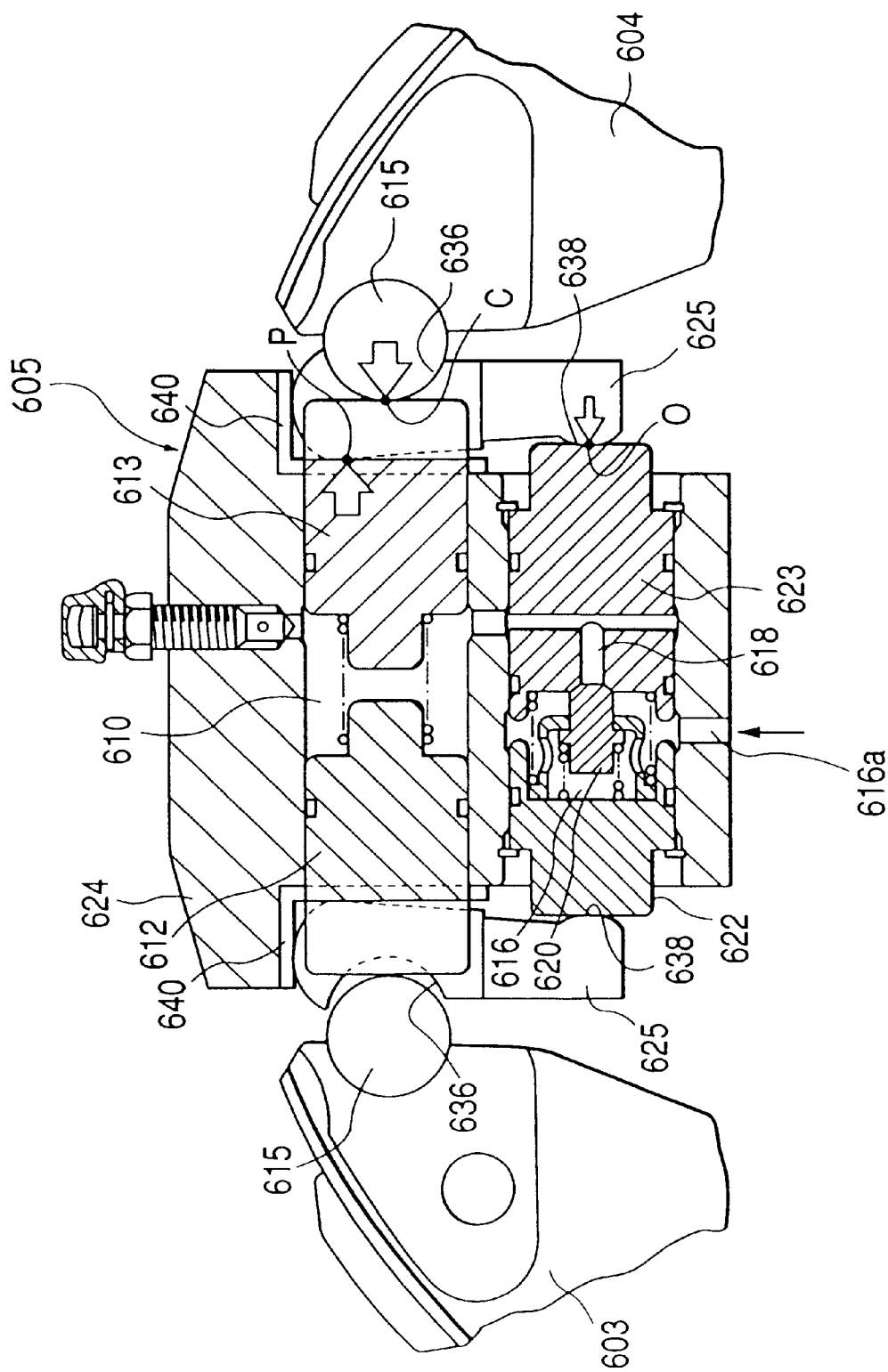
FIG. 11 is a cross-sectional view showing the operation of the principal elements of the drum brake when the anchor reaction force is larger than the input from the master cylinder by a predetermined magnifying power.
Figure 12:
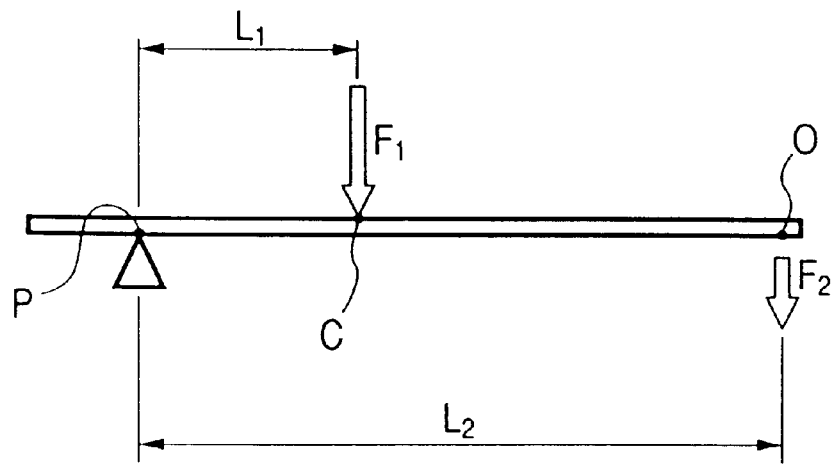
FIG. 12 is a diagrammatic representation showing the operation of lever members provided for the drum brake according to the second embodiment.
Figure 16:
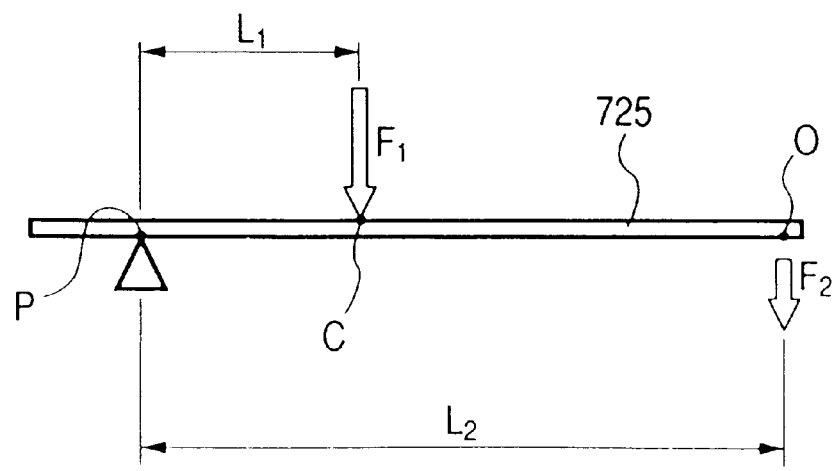
FIG. 16 is a diagrammatic representation showing the operation of lever member provided for the drum brake according to the third embodiment.

FIGS. 9 through 12, and 18, show a drum brake according to one drum brake in accordance with the present invention. FIG. 9 is a cross-sectional view showing the principal elements of the drum brake while the drum brake is in an inoperative state; FIG. 10 is a perspective view schematically showing the configuration of the drum brake; FIG. 11 is a cross-sectional view showing the operation of the principal elements of the drum brake when the anchor reaction force is larger than the input from the master cylinder by a predetermined magnifying power; and FIG. 12 is a diagrammatic representation showing the operation of lever members provided for the drum brake according to the second embodiment.

A drum brake is of so-called duo-servo type and, as shown in FIG. 10, comprises a pair of brake shoes 603, 604, or a primary shoe 603 and a secondary shoe 604, which are disposed so as to face each other within an internal space of a cylindrical drum; a wheel cylinder 605 which is interposed between the opposed edges at one longitudinal end of the pair of brake shoes 603, 604 and expand the brake shoes 603, 604; a link mechanism (not shown) which is interposed between the opposed edges at the other longitudinal end of the pair of brake shoes 603, 604 and applies an output from the primary shoe 603 to the secondary shoe 604; and a backing plate 607 supporting these constituent members.

The brake shoe 603 comprises a circular-arch plate-like rim 603*a;* a web 603*b* radially and inwardly extending from the rim 603*a;* and a lining 603*c* bonded to the outer periphery of the rim 603*a*. Similarly, the brake shoe 604 comprises a circular-arch plate-like rim 604*a;* a web 604*b* radially and inwardly extending from the rim 604*a;* and a lining 604*c* bonded to the outer periphery of the rim 604*a*. The brake shoes 603, 604 are attached to a backing plate 607 so as to advance to or recede from the internal peripheral surface of the drum.

The opposed edges on one longitudinal end of the pair of brake shoes 603, 604 provided on the backing plate 607 are forced so as to approach each other (or to move away from the drum) by return springs (not shown).

A strut and a parking lever constituting a parking brake are provided on the backing plate 607, and the pair of brake shoes 603, 604 can also be pressed against the drum even by actuation of the parking lever.

The link mechanism constitutes an adjuster which has an adjustable length and adjusts the space between the edges of the brake shoes 603, 604 in accordance with the degree of wear of the linings 603*c,* 604*c* of the respective brake shoes 603, 604. The space between the edges of the brake shoes 603, 604 is automatically adjusted by actuation of a link mechanism lever which abuts at the front end the adjustment wheels provided on the link mechanism by a spring (not shown).

In order to eliminate a drawback of the existing duo-servo type drum brake; i.e., a low degree of stability of braking effect, the wheel cylinder 605 is constituted as follows.

More specifically, the wheel cylinder 605 comprises a pair of drive pistons 612, 613 which are provided so as to face each other with a pressure chamber 610 between them and are forwardly and rearwardly actuated toward the edges of the brake shoes 603, 604 by a hydraulic pressure supplied to the pressure chamber 610 (function of which is similar to the first pressure chamber in the first embodiment); anchor pins 615, one anchor pin being sandwiched between a plane surface 612*a* at the front end of the drive piston 612 and the edge of the brake shoe 603 opposite the plane surface 612*a* and the other anchor pin being sandwiched between a plane surface 613*a* at the front end of the drive piston 613 and the edge of the brake shoe 604 opposite the plane surface 613*a,* and the anchor pins serving as pressing force transmission means; a control chamber 616, function of which is similar to the second pressure chamber in the first embodiment, and which is positioned in the vicinity of the center of the drum in relation to the pressure chamber 610 and receives the hydraulic pressure produced by the master cylinder (not shown) according to the degree of braking effect through a supply port 616*a;* a normally-open control valve 620 which is provided in the control chamber 616 and opens/closes a fluid channel 618 connecting the pressure chamber 610 to the control chamber 616; a pair of control pistons 622, 623 which are positioned at the center of the drum in relation to the pair of drive pistons 612, 613 as well as in parallel with the pair of drive pistons 612, 613 in such a way that the base ends of the control pistons 622, 623 face each other with the control chamber 616 between them; a cylinder body 624 which slidably supports the pair of control pistons and the pair of drive pistons 612, 613 and defines the foregoing pressure chamber 610 and the control chamber 616; and lever members 625, one lever member being at one end positioned in the vicinity of the front end of the drive piston 612 and being at the other end position in the vicinity of the front end of the control piston 622, another lever member being at one end positioned in the vicinity of the front end of the drive piston 613 and being at the other end positioned in the vicinity of the front end of the control piston 623, the lever members transmitting the anchor reaction force exerted on the drive pistons 612, 613 from the brake shoes to the control pistons 622, 623.

The drive pistons 612, 613 are fluid-tightly and slidably supported by annular sealing members 627 fitted into a sealing groove of the cylinder body 624. The front ends of the drive pistons 612, 613 protruding from the cylinder body 624 are finished flat.

In order to hold the front ends of the drive pistons 612, 613 in a pressed contact with the brake shoes 603, 604 via the anchor pins 615, a spring (compression spring) 629 for forcibly separating the drive pistons 612, 613 from each other is provided in the pressure chamber 610 where the base ends of the drive pistons 612, 613 face one another.

Further, a bleed screw 610*a* for the purpose of releasing air is formed in the pressure chamber 610.

The anchor pins 615 have a columnar shape and the axis aligned in the axial direction of the drum. One side of the outer peripheral surface of the anchor pin 615 abuts the plane surface 612*a* at the front end of the drive piston 612, and the other side of the same is engaged with a hemispherically concave surface 603*d* formed in the end of the brake shoe 603 opposite the plane surface 612*a*. Similarly, one side of the outer peripheral surface of the other anchor pin 615 abuts the plane surface 613*a* at the front end of the drive piston 613, and the other side of the same is engaged with a hemispherically concave surface 604*d* formed in the end of the brake shoe 604.

More specifically, one of the anchor pins 615 is sandwiched between the plane surface 612*a* of the drive piston 612 and the hemispherically concave surface 603*d* of the brake shoe 603, and the other anchor pint 615 is sandwiched between the plane surface 613*a* of the drive piston 613 and the hemispherically concave surface 604*d* of the brake shoe 604.

The control pistons 622, 623 are fluid-tightly and slidably supported by annular sealing members 631 fitted into the sealing grooves of the cylinder body 624. The base ends of the control pistons 622, 623 are forced so as to separate from each other by a spring (compression spring) 632 provided in the control chamber 616. The extent to which the control pistons 622, 623 are protruded is regulated as a result of stepped sections 622*a*, 623*a* formed at the respective front ends of the control pistons 622, 623 coming into collision with anchor plates 634, 635 fixedly joined to the cylinder body 624.

When pressing force F2 exerted on the front ends of the control pistons 622, 623 becomes greater than the hydraulic pressure exerted on the base ends of the same, the control pistons 622, 623 are pushed back toward the control chamber 616, thereby closing the control valve 620.

One end of each of the lever members 625 has a bifurcated portion extending across the front end of each of the drive pistons 612, 613. A hemispherically concave reaction force receiving section 636 (which is formed into a cylindrical surface whose axis is aligned with the axial direction of the drum in the second embodiment) is formed at one end of each lever member 625, and the outer peripheral surface of the anchor pin 615 forcibly displaced toward the drive piston 612 by the anchor reaction force comes into contact with this receiving section. Further, the outer peripheral surface of the anchor pin 615 displaced toward the drive piston 613 by the anchor reaction force comes into contact with the receiving section. A convexly curved section 637 (a cylindrical surface whose axis is aligned with the axial direction of the drum in the second embodiment) is formed on the other end of the bifurcated portion of each lever member 625. The convexly curved section 637 rotatably comes into contact with the anchor plate 634 anchor plates 640 and acts as a fulcrum at the position where the convexly curved section 637 is positioned outside in the radial direction of the drum in relation to the reaction force receiving section 636.

The anchor plates 640 are made of metallic material having a higher degree of abrasion resistance than that of the cylinder body 624. In order to reduce a coefficient of friction between the anchor plates 640 and the convexly curved sections 637, the surface of the anchor plates 640 is smoothly finished. These anchor plates 640 are intended to prevent the cylinder body 624 from becoming abraded as a result of the cylinder body 624 coming into frictional contact with the lever members 625. In a case where the cylinder body 624 is formed from material possessing superior abrasion resistance, the anchor plates can be omitted.

A convexly curved reaction force output section 638 (a cylindrical surface whose axis is aligned with the axial direction of the drum in the second embodiment) is formed at the other end of each lever member 625. The front end surfaces of the control pistons 622, 623 come into contact with the respective output sections 638.

With the foregoing construction, as shown in FIGS. 11 and 12, the lever member 625 pivots about the fulcrum P, i.e., a point of contact between the convexly curved surface 637 and the anchor plate 634, by anchor reaction force F1 exerted on a point of contact C between the anchor pin 615 and the anchor plate 634. Similarly, another lever member 625 pivots about the fulcrum P, i.e., a point of contact between the convexly curved surface 637 and the anchor plate 635, by the anchor reaction force F1 exerted on the point of contact C between the anchor pin 615 and the anchor plate 635. The lever member 625 reduces the anchor reaction force exerted on the point of contact C in a given proportion. The thus-reduced reaction force is output to a point of contact O between the control piston 622 and the reaction force output section 638 and another point of contact O between the control piston 623 and the reaction force output section 638.

The ratio at which the anchor reaction force F1 exerted on the point of contact C is reduced is proportional to a ratio of a distance L1 between the fulcrum P and the point of contact C to a distance L2 between the fulcrum P and the point of contact O. In contrast, the anchor reaction force F2 exerted on the control pistons 622, 623 from the lever member 625 is defined as (L1/L2) F1.

As shown in FIG. 10, the input control valve 620 comprises a cylindrical valve body 620*a* having at one end spherically closed, and a flange 620*b* projectingly formed around the outer peripheral surface of the valve body 620*a*. A spring 642 interposed between the flange 620*b* and the control piston 622 forces the input control valve 620 toward the other control piston 623. The maximum extent to which the input control valve 620 forced by the spring 642 protrudes is regulated by a positioning piece 643 with which the flange 620*b* comes into contact. This positioning piece 643 is fixedly supported by the cylinder body 624 which defines the control pressure chamber 615.

The fluid channel 618 connecting the control pressure chamber 616 to the pressure chamber 610 is formed in the control piston 623. A valve seat 623*a* on which the input control valve 620 is placed is formed at the open end of the control pressure chamber 616 opposite the input control valve 620 of the control piston 623.

Provided that the drum is rotatively driven in the direction designated by an arrow A shown in the drawing when a vehicle forwardly travels, the lever member 625 in the vicinity of the brake shoe 604 serving as the secondary shoe transmits the anchor reaction force to the control piston 623. In contrast, when the vehicle rearwardly travels, the brake shoe 603 acts as the secondary shoe, and the lever member 625 in the vicinity of the brake shoe 603 transmits the anchor reaction force to the control piston 622.

As shown in FIG. 9, with the foregoing arrangement, the control valve 620 opens the fluid channel 618 connecting the pressure chamber 610 to the control chamber 616 when the drum brake is in an inoperative state. If hydraulic pressure is supplied to the control chamber 616 from the master cylinder by braking effect, the hydraulic pressure is immediately supplied to the pressure chamber 610.

As shown in FIG. 10, if the hydraulic pressure is supplied to the pressure chamber 610 via the control chamber 616 as a result of the braking effect, the pair of drive pistons 612, 613 are pushed out of the pressure chamber 610, thereby pressing the edges of the primary and secondary shoes 603, 604 via the anchor pins 615.

The brake shoes 603, 604 whose ends are pressed by the drive pistons 612, 613 are expanded and brought against the drum, thereby producing braking force. At the time of the braking effect, anchor reaction force corresponding to the magnitude of the braking effect is transmitted to the drive piston 613 via the anchor pin 615.

If the braking effect is increased and the anchor pin is pressed to a given extent or more by the anchor reaction force, the anchor pin 615 presses one end of each of the lever members 625 along with the drive piston 613.

The anchor reaction force transmitted to the lever members 625 acts as the force for pushing back the control piston 622 which is protruding under the pressure of the master cylinder.

Accordingly, when the anchor reaction force becomes larger than the input from the master cylinder by a predetermined magnifying power, the control piston 622 is pushed back by the anchor reaction force F2 exerted on the control piston 622.

The control piston 623 pushed back by the anchor reaction force causes the normally-open control valve 620 to close the fluid channel 618 and holds the pressure chamber 610 in a sealed state, thereby constantly maintaining the hydraulic pressure of the pressure chamber 610 exerted on the drive pistons 612, 613.

If there is a drop in the braking effect at the time of the braking effect while the pressure chamber 610 is held in a sealed state, the anchor reaction force exerted on the control piston 622 via the lever member 625 is reduced. The control piston 623 is again protruded by the hydraulic pressure received from the master cylinder, and then the normally-open control valve 620 causes the fluid channel 618 to open again to thereby resume the supply of the hydraulic pressure to the pressure chamber 610.

As described above, since the control pistons 622, 623 control the supply of the hydraulic pressure to the pressure chamber 610 according to the anchor reaction force, the wheel cylinder can stably receive the anchor reaction force that is larger than the input from the master cylinder by a predetermined magnifying power.

The drum brake 601 in the second embodiment is basically a duo-servo type drum brake, and therefore the advantages of the duo-servo type drum brake; e.g., the advantages of a high degree of braking effect and easy incorporation of a parking brake, are ensured, exactly as they are.

In the thus-contrived wheel cylinder 605, when the anchor reaction force of the secondary shoe 604 becomes larger than the input from the master cylinder by a predetermined magnifying power, the control piston 622 that receives at the front end the anchor reaction force via the lever member 625 is displaced toward the control chamber 616, thereby closing the control valve 620 that opens/closes the fluid channel 618 connecting the master cylinder to the pressure chamber 610. As a result, the hydraulic pressure exerted on the pair of drive pistons 603, 604 that press the primary and secondary shoes 603, 604 is constantly held.

Accordingly, the anchor reaction force that is larger than the input by a predetermined magnifying power can be stably obtained, thereby eliminating the serious disadvantage of the existing duo-servo type drum brake; i.e., the disadvantage of instable braking effect.

Consequently, the drum brake according to the present invention provides a high degree of braking effect and realizes stable braking effect and easy incorporation of a parking brake. Miniaturization of a servo mechanism of the master cylinder enables a reduction in the size and cost of the brake.

In the foregoing construction, a servo ratio at which the control valve 620 is actuated can be set to an arbitrary value by changing the pressure-receiving areas of the control pistons 622, 623 facing the control chamber 616 and the ratio (so called as a leverage) between the levers 625 which transmit the anchor reaction force to the control pistons 622, 623. Therefore, engineering changes can be readily made to braking characteristics according to the type of a vehicle.

The levers 625 can input the anchor input received from the brake shoes to the respective control pistons 622, 623 after having considerably reduced the input. In other words, the pressure-receiving areas of the control pistons 622, 623 facing the control chamber 616 can be considerably reduced by setting the ratio (so called as a leverage) between the levers 625, as required. The miniaturization of the control pistons 622, 623 makes it possible to render the wheel cylinder 605 or more easily make the drum brake compact.

The end faces of the drive pistons 612, 613 for pressing the edges of the brake shoes 603, 604 via the anchor pins 615 are formed into plane surfaces. The contact between the anchor pin 615 and the drive piston 612 and the contact between the anchor pin 615 and the drive piston 613 are realized by combination of a circumferential surface and a plane surface. Therefore, torsional force is prevented from developing between the anchor pin 615 and the end face of the drive piston 612 and between the anchor pin 615 and the end face of the drive piston 613, thereby resulting in an improvement in the operation reliability of the drum brake.

A drum brake according to a third embodiment of the present invention will be described in detail hereinbelow with reference to the drawings.

Figure 13:
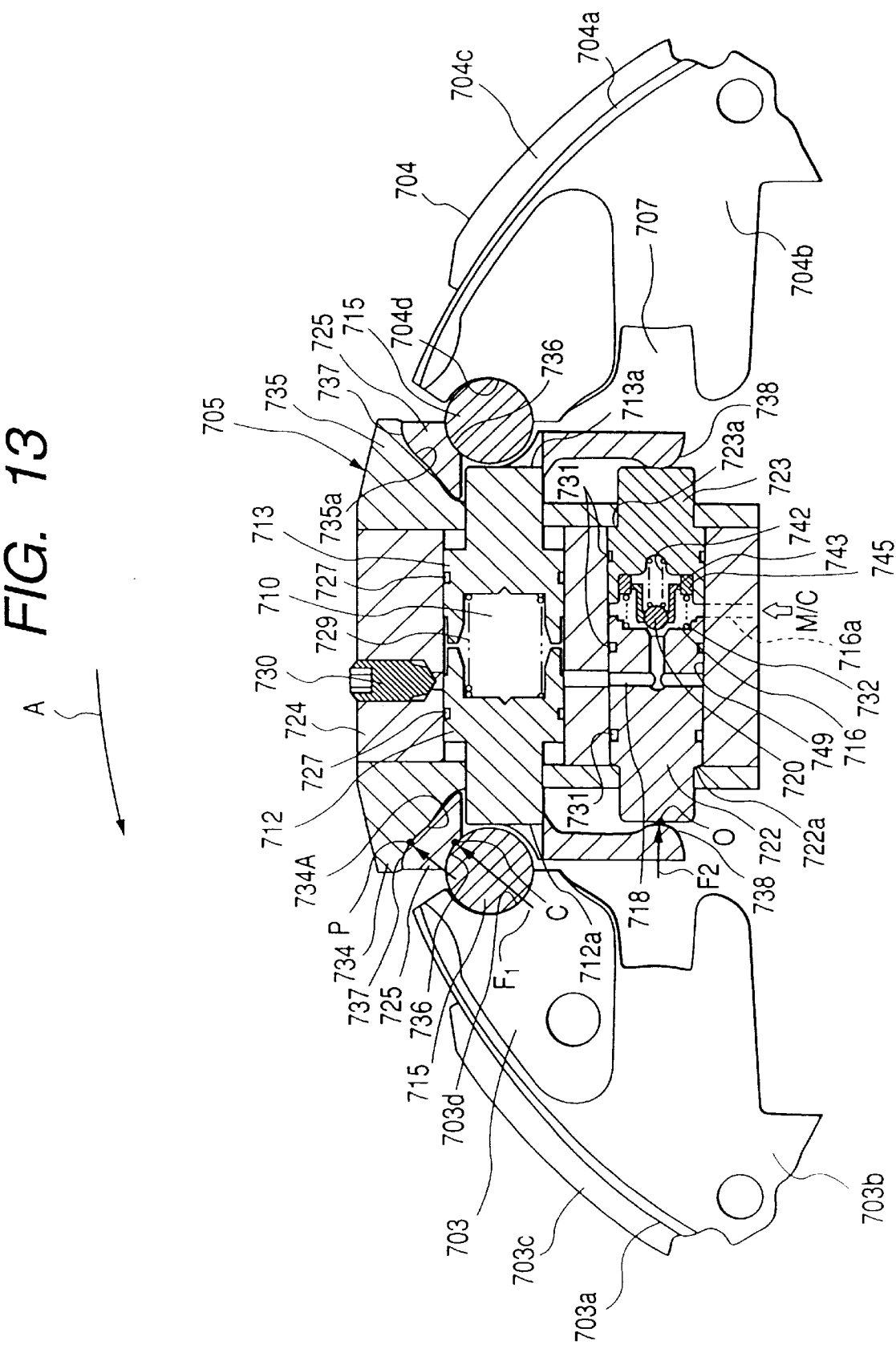
FIG. 13 is a cross-sectional view showing the principal elements of the drum brake while the drum brake is in an inoperative state.
Figure 14:
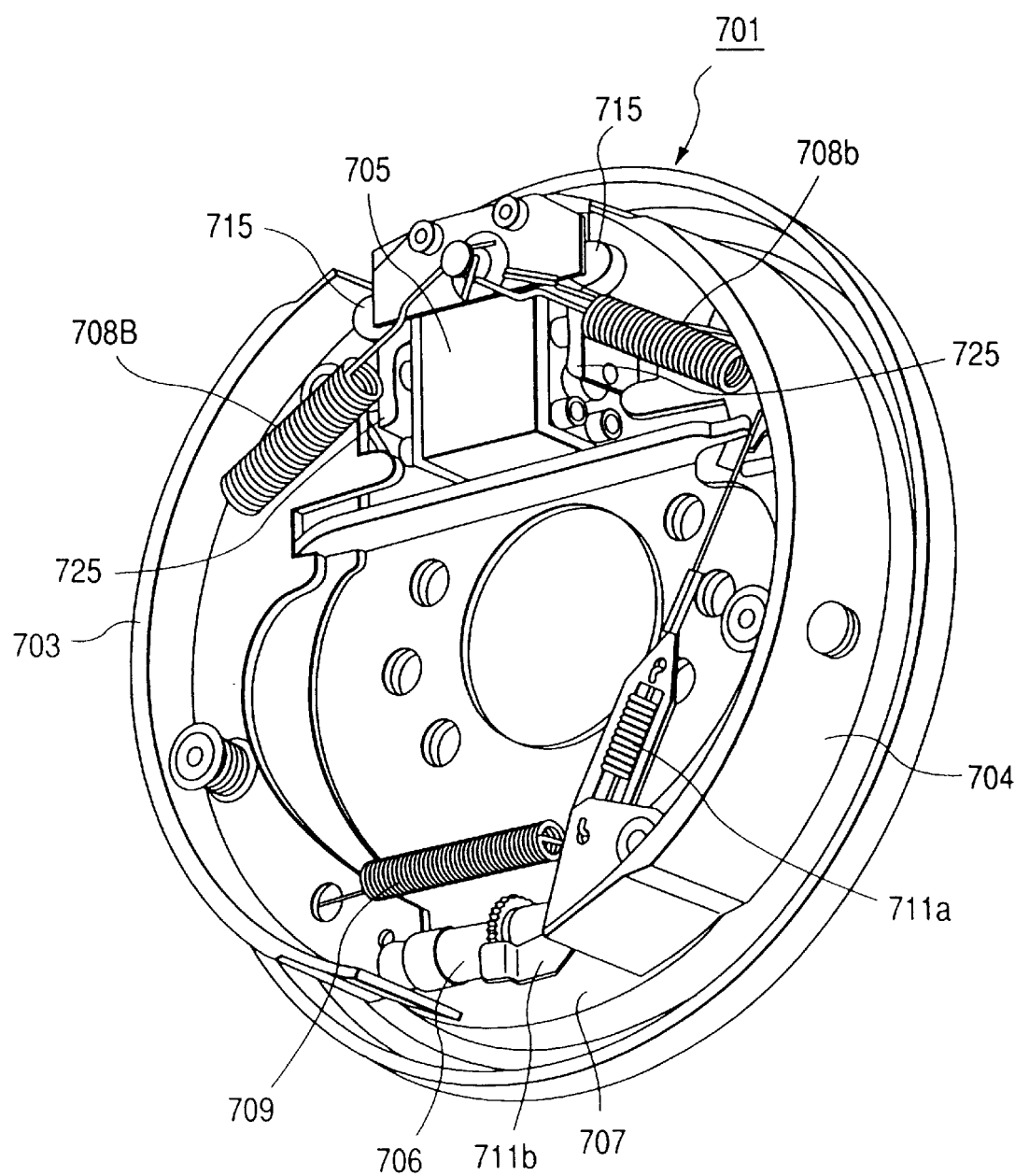
FIG. 14 is a perspective view schematically showing the configuration of the drum brake.
Figure 15:
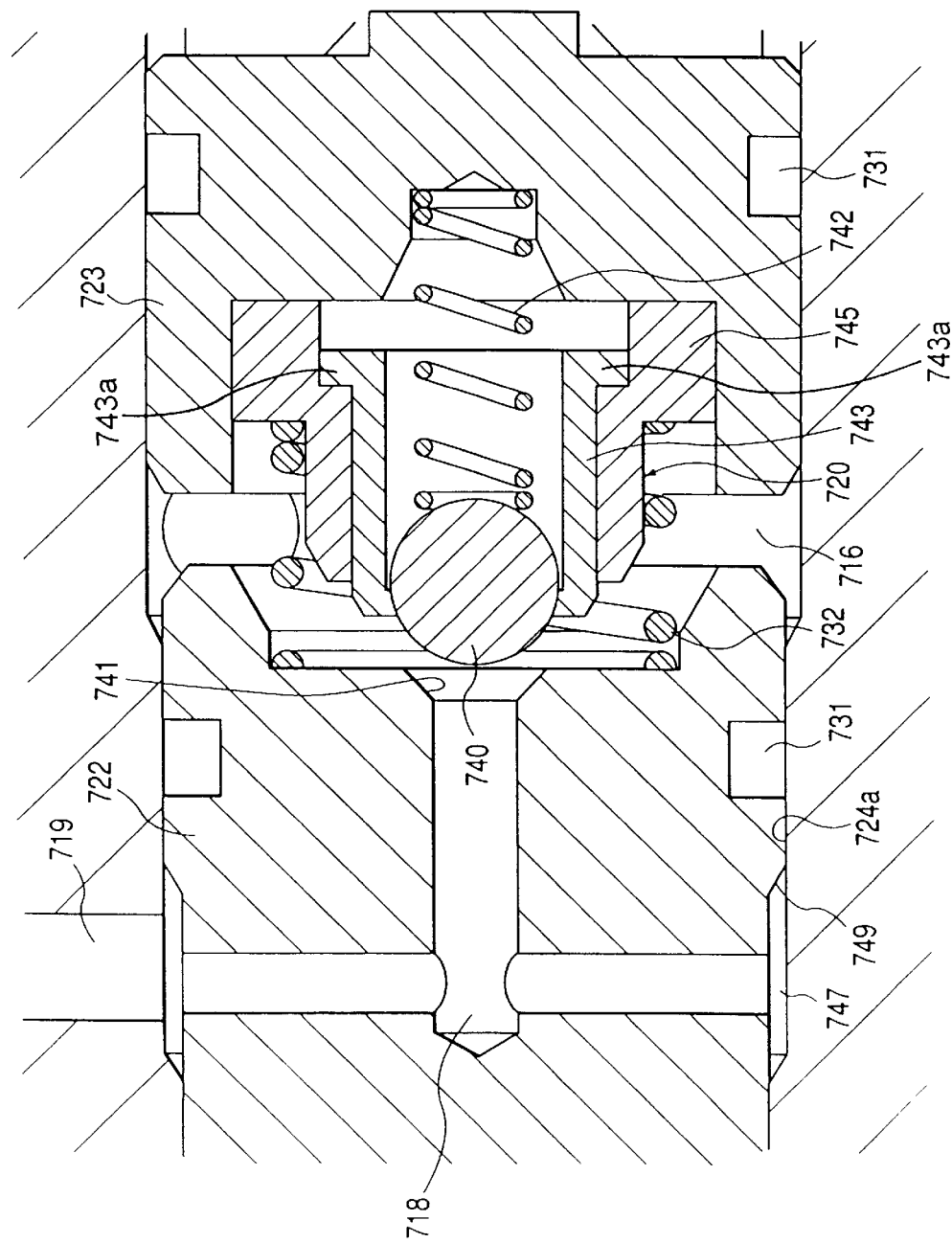
FIG. 15 is a cross-sectional view showing the operation of the principal elements of the drum brake when anchor reaction force is smaller than an input from the master cylinder by a predetermined magnifying power.
Figure 17:
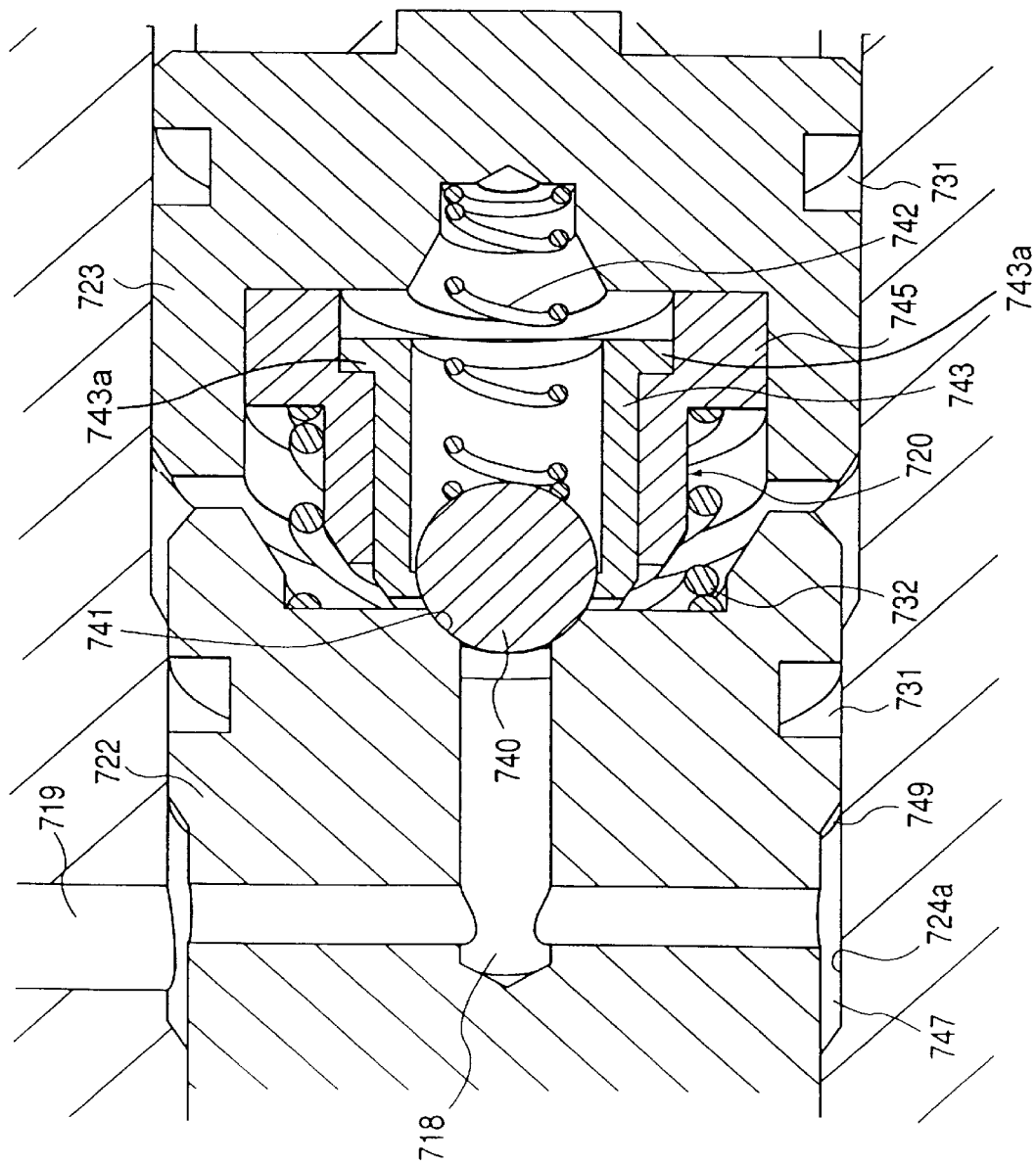
FIG. 17 is a cross-sectional view showing the operation of the principal elements of the drum brake when the anchor reaction force is larger than the input from the master cylinder by a predetermined magnifying power.
Figure 18:
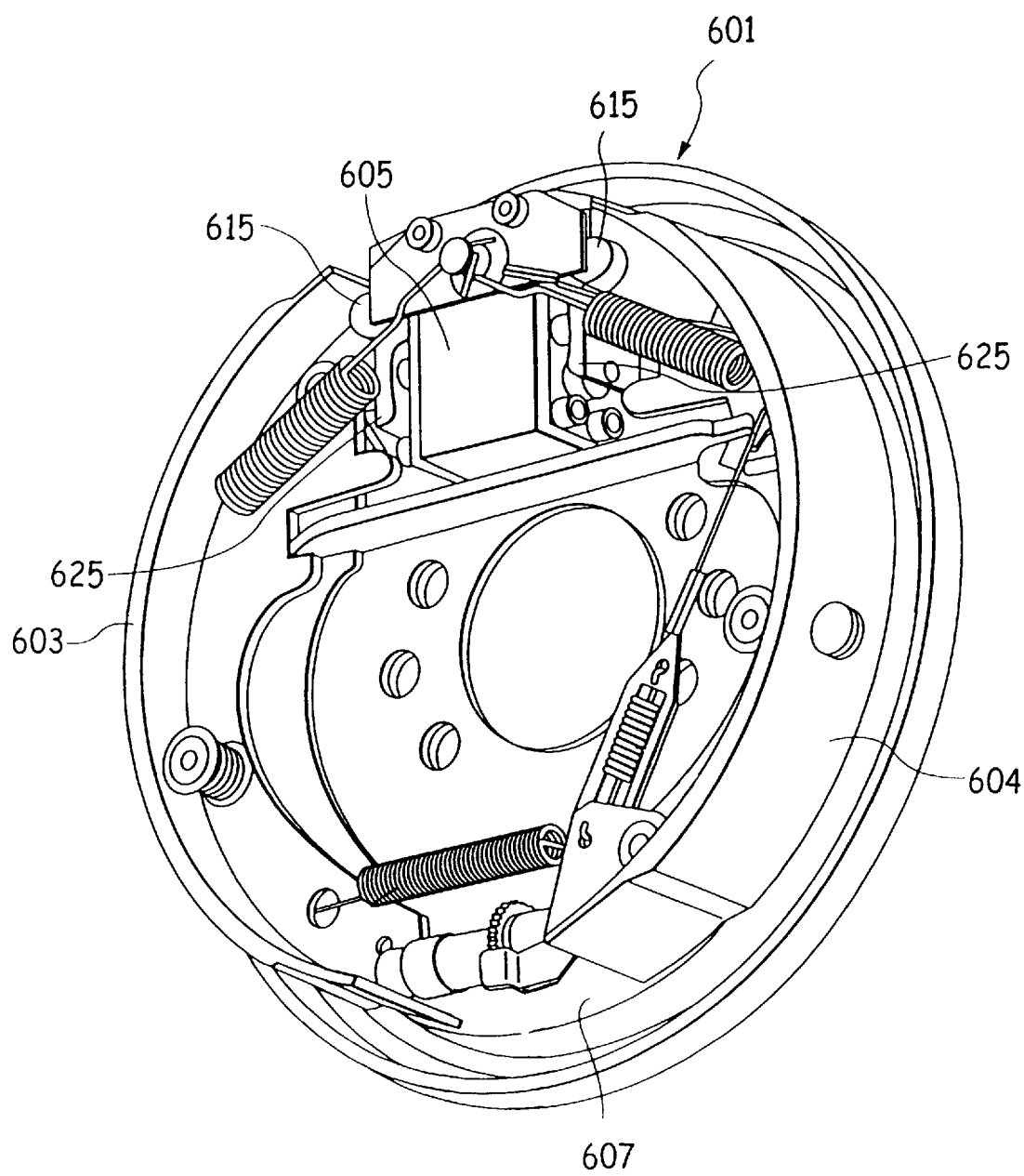
FIG. 18 is a perspective view of the invention.

FIGS. 13 through 17 show a drum brake according to one drum brake in accordance with the present invention. FIG. 13 is a cross-sectional view showing the principal elements of the drum brake while the drum brake is in an inoperative state; FIG. 14 is a perspective view schematically showing the configuration of the drum brake; FIG. 15 is a cross-sectional view showing the operation of the principal elements of the drum brake when anchor reaction force is smaller than an input from the master cylinder by a predetermined magnifying power; and FIG. 17 is a cross-sectional view showing the operation of the principal elements of the drum brake when the anchor reaction force is larger than the input from the master cylinder by a predetermined magnifying power.

A drum brake 701 is of so-called duo-servo type and, as shown in FIG. 14, comprises a pair of brake shoes 703, 704, or a primary shoe 703 and a secondary shoe 704, which are disposed so as to face each other within an internal space of a cylindrical drum; a wheel cylinder 705 which is interposed between the opposed edges at one longitudinal end of the pair of brake shoes 703, 704 and expand the brake shoes 703, 704; an adjuster (as a link mechanism) 706 which is interposed between the opposed edges at the other longitudinal end of the pair of brake shoes 703, 704 and applies an output from the primary shoe 703 to the secondary shoe 704; and a backing plate 707 supporting these constituent members.

As shown in FIG. 14, the brake shoe 703 comprises a circular-arch plate-like rim 703*a;* a web 703*b* radially and inwardly extending from the rim 703*a;* and a lining 703*c* bonded to the outer periphery of the rim 703*a.* Similarly, the brake shoe 704 comprises a circular-arch plate-like rim 704*a;* a web 704*b* radially and inwardly extending from the rim 704*a;* and a lining 704*c* bonded to the outer periphery of the rim 704*a.* The brake shoes 703, 704 are attached to a backing plate 707 so as to advance to or recede from the internal peripheral surface of the drum.

The opposed edges on one longitudinal end of the pair of brake shoes 703, 704 provided on the backing plate 707 are forced so as to approach each other (or to move away from the drum) by return springs 708*a,* 708*b,* and 709.

A strut and a parking lever constituting a parking brake are provided on the backing plate 707, and the pair of brake shoes 703, 704 can also be pressed against the drum even by actuation of the parking lever.

The adjuster 706 adjusts the interval between the edges of the brake shoes 703, 704 in accordance with the degree of abrasion of the linings 703*c,* 704*c* of the respective brake shoes 703, 704. The interval between the edges of the brake shoes 703, 704 is automatically adjusted by actuation of an adjuster lever 711*b* which abuts at the front end adjuster wheel provided on the adjuster 706 by an adjuster spring 711*a.*

In order to eliminate a drawback of the existing duo-servo type drum brake; i.e., a low degree of stability of braking effect, the wheel cylinder 705 is provided with a contrivance characterizing the present invention.

More specifically, the wheel cylinder 705 comprises a pair of drive pistons 712, 713 which are provided so as to face each other with a pressure chamber 710, function of which is similar to the first pressure chamber of the first embodiment, and which is interposed therebetween and are forwardly and rearwardly actuated toward the edges of the brake shoes 703, 704 by a hydraulic pressure supplied to the pressure chamber 710; anchor pins 715, one anchor pin being sandwiched between a plane surface 712*a* at the front end of the drive piston 712 and the edge of the brake shoe 703 opposite the plane surface 712*a* and the other anchor pin being sandwiched between a plane surface 713*a* at the front end of the drive piston 713 and the edge of the brake shoe 704 opposite the plane surface 713*a,* and the anchor pins serving as pressing force transmission means; a control chamber 716, function of which is similar to the second pressure chamber of the first embodiment, and which is positioned in the vicinity of the center of the drum in relation to the pressure chamber 710 and receives the hydraulic pressure produced by the master cylinder (M/C) according to the degree of braking effect through a supply port 716*a;* a control valve 720 which is provided in the control chamber 716 and opens/closes a fluid channel 718 connecting the pressure chamber 710 to the control chamber 716; a pair of control pistons 722, 723 which are positioned in the vicinity of the center of the drum in relation to the pair of drive pistons 712, 713 as well as in parallel with the pair of drive pistons 712, 713 in such a way that the base ends of the control pistons 722, 723 face each other with the control chamber 716 interposed therebetween; a cylinder body 724 which slidably supports the pair of control pistons and the pair of drive pistons 712, 713 and defines the foregoing pressure chamber 710 and the control chamber 716; and lever members 725, one lever member being at one end positioned in the vicinity of the front end of the drive piston 712 and being at the other end position in the vicinity of the front end of the control piston 722, another lever member being at one end positioned in the vicinity of the front end of the drive piston 713 and being at the other end positioned in the vicinity of the front end of the control piston 723, the lever members transmitting the anchor reaction force exerted on the drive pistons 712, 713 from the brake shoes to the control pistons 722, 723.

The drive pistons 712, 713 are fluid-tightly and slidably supported by annular sealing members 727 fitted into a sealing groove of the cylinder body 724. The front ends of the drive pistons 712, 713 protruding from the cylinder body 724 are finished flat.

In order to hold the front ends of the drive pistons 712, 713 in a pressed contact with the brake shoes 703, 704 via the anchor pins 715, a spring (compression spring) 729 for forcibly separating the drive pistons 712, 713 from each other is provided in the pressure chamber 710 where the base ends of the drive pistons 712, 713 face one another.

Further, a bleed screw 730 for the purpose of releasing air is formed in the pressure chamber 710.

The anchor pins 715 have a columnar shape and the axis aligned in the axial direction of the drum. One side of the outer peripheral surface of the anchor pin 715 abuts the plane surface 712*a* at the front end of the drive piston 712, and the other side of the same is engaged with a hemispherically concave surface 703*d* formed in the end of the brake shoe 703 opposite the plane surface 712*a.* Similarly, one side of the outer peripheral surface of the other anchor pin 715 abuts the plane surface 713*a* at the front end of the drive piston 713, and the other side of the same is engaged with a hemispherically concave surface 704*d* formed in the end of the brake shoe 704.

More specifically, one of the anchor pins 715 is sandwiched between the plane surface 712*a* of the drive piston 712 and the hemispherically concave surface 703*d* of the brake shoe 703, and the other anchor pin 715 is sandwiched between the plane surface 713*a* of the drive piston 713 and the hemispherically concave surface 704*d* of the brake shoe 704.

The control pistons 722, 723 are fluid-tightly and slidably supported by annular sealing members 731 fitted into the sealing grooves of the cylinder body 724. The base ends of the control pistons 722, 723 are forced so as to separate from each other by a spring (compression spring) 732 provided in the control chamber 716. The extent to which the control pistons 722, 723 are protruded is regulated as a result of stepped sections 722*a,* 723*a* formed at the respective front ends of the control pistons 722, 723 coming into collision with anchor plates 734, 735 fixedly joined to the cylinder body 724.

When pressing force F2 exerted on the front ends of the control pistons 722, 723 becomes greater than the hydraulic pressure exerted on the base ends of the same, the control pistons 722, 723 are pushed back toward the control chamber 716, thereby closing the control valve 720.

One end of each of the lever members 725 has a bifurcated portion extending across the front end of each of the drive pistons 712, 713. A hemispherically concave reaction force receiving section 736 (which is formed into a cylindrical surface whose axis is aligned with the axial direction of the drum in the third embodiment) is formed at one end of each lever member 725, and the outer peripheral surface of the anchor pin 715 forcibly displaced toward the drive piston 712 by the anchor reaction force comes into contact with this receiving section. Further, the outer peripheral surface of the anchor pin 715 displaced toward the drive piston 713 by the anchor reaction force comes into contact with the receiving section. A convexly curved section 737 (a cylindrical surface whose axis is aligned with the axial direction of the drum in the third embodiment) is formed on the other end of the bifurcated portion of each lever member 725. The convexly curved section 737 rotatably comes into contact with a cylindrically curved surface 734a of the anchor plate 734 and acts as a fulcrum at the position where the convexly curved section 737 is positioned outside in the radial direction of the drum in relation to the reaction force receiving section 736. Similarly, the convexly curved section 737 rotatably comes into contact with a cylindrically curved surface 735a of the anchor plate 735 and acts as a fulcrum at the position where the convexly curved section 737 is positioned outside in the radial direction of the drum in relation to the reaction force receiving section 736.

The anchor plates 734, 735 are made of metallic material having a higher degree of wear resistance than that of the cylinder body 724. In order to reduce a coefficient of friction between the anchor plates 734, 735 and the convexly curved sections 737, the surface of the anchor plates 734, 735 is smoothly finished. These anchor plates 734, 735 are intended to prevent the cylinder body 724 from becoming abraded as a result of the cylinder body 724 from coming into frictional contact with the lever members 725.

A convexly curved reaction force output section 738 (a cylindrical surface whose axis is aligned with the axial direction of the drum in the third embodiment) is formed at the other end of each lever member 725. The front end surfaces of the control pistons 722, 723 come into contact with the respective output sections 738.

With the foregoing construction, as shown in FIGS. 13 and 15, the lever member 725 pivots about the fulcrum P, i.e., a point of contact between the convexly curved surface 737 and the anchor plate 734, by anchor reaction force F1 exerted on a point of contact C between the anchor pin 715 and the anchor plate 734. Similarly, another lever member 725 pivots about the fulcrum P, i.e., a point of contact between the convexly curved surface 737 and the anchor plate 735, by the anchor reaction force F1 exerted on the point of contact C between the anchor pin 715 and the anchor plate 735. The lever member 725 reduces the anchor reaction force exerted on the point of contact C in a predetermined proportion. The thus-reduced reaction force is output to a point of contact O between the control piston 722 and the reaction force output section 738 and another point of contact O between the control piston 723 and the reaction force output section 738.

The ratio at which the anchor reaction force F1 exerted on the point of contact C is reduced is proportional to a ratio of a distance L1 between the fulcrum P and the point of contact C to a distance L2 between the fulcrum P and the point of contact O. In contrast, the anchor reaction force F2 exerted on the control pistons 722, 723 from the lever member 725 is defined as (L1/L2) F1.

As shown in FIG. 15, the control valve 720 comprises a spherical valve body 740, a valve seat 741 which interrupts a communication between the fluid channel 718 and the control chamber 716 when the valve body 740 is placed in the valve seat 741, and a bulb spring 742 for forcing the valve body 40 toward the valve seat 741.

This valve body 740 is slidably held in a substantially-cylindrical holder 743. This holder 743 has a smaller diameter at its front end in order to prevent the valve body 740 from being removed from the holder 743, as well as a flange 743a at the base end. The valve body 740 is retained so as to be able to move back or forth over a predetermined distance toward the control piston 722 by a guide tube 745 held in pressed contact with the base end surface of the control piston 723 by the spring 732 for forcing the pair of control pistons 722 and 723 away from each other.

A valve spring 742 is fitted to the inside of the holder 743 in a compressed manner and forces the valve body 740 and the holder 743 so as to protrude toward the control piston 722 to the maximum extent.

The dimension of each of the foregoing elements is determined in such a way that the valve body 740 is retained in a position spaced away from the valve seat 741 in a case where the anchor reaction force is smaller than given force.

The valve seat 741 is formed at the open end of the fluid channel 718 formed through the control piston 722. This fluid channel 718 connects the pressure chamber 710 to the control chamber 716 via a communication fluid channel 719 formed in the cylinder body 724.

A cylinder inner wall 724a for slidably supporting the control piston 722 is formed around the outer peripheral surface of the control piston 722 for opening/closing the control valve 720, and an auxiliary fluid chamber 747 communicated with the pressure chamber 710 is formed between this cylinder inner wall 724a and the outer peripheral surface of the control piston 722. Further, a stepped section 749 is formed in the outer peripheral surface of the control piston 722 so as to increase the volume of the auxiliary fluid chamber 747 when the control piston 722 is displaced toward the control chamber 716.

Provided that the drum is rotatively driven in the direction designated by an arrow A shown in FIG. 13 when a vehicle forwardly travels, the lever member 725 in the vicinity of the brake shoe 704 serving as the secondary shoe transmits the anchor reaction force to the control piston 723. In contrast, when the vehicle rearwardly travels, the brake shoe 703 acts as the secondary shoe, and the lever member 725 in the vicinity of the brake shoe 703 transmits the anchor reaction force to the control piston 722.

As shown in FIG. 13, with the foregoing arrangement, the control valve 720 opens the fluid channel 718 connecting the pressure chamber 710 to the control chamber 716 when the drum brake is in an inoperative state. If hydraulic pressure is supplied to the control chamber 716 from the master cylinder by braking effect, the hydraulic pressure is immediately supplied to the pressure chamber 710.

If the hydraulic pressure is supplied to the pressure chamber 710 via the control chamber 716 as a result of the braking effect, the pair of drive pistons 712, 713 are pushed out of the pressure chamber 710, thereby pressing the edges of the primary and secondary shoes 703, 704 via the anchor pins 715.

The brake shoes 703, 704 whose ends are pressed by the drive pistons 712, 713 are expanded and brought against the drum, thereby producing braking force. At the time of the braking effect, anchor reaction force corresponding to the magnitude of the braking effect is transmitted to the drive piston 713 via the anchor pin 715.

If the braking effect is increased and the anchor pin is pressed to a given extent or more by the anchor reaction force, the anchor pin 715 presses one end of each of the lever members 725 along with the drive piston 713.

The anchor reaction force F1 transmitted to the lever members 725 acts as the force for pushing back the control piston 722 which is protruding under the pressure of the master cylinder.

Accordingly, when the anchor reaction force becomes larger than the input from the master cylinder by a predetermined magnifying power, the control piston 722 is pushed back by the anchor reaction force F2 exerted on the control piston 722.

The control piston 722 pushed back by the anchor reaction force causes the normally-open control valve 720 to close the fluid channel 718 and holds the pressure chamber 710 in a sealed state, thereby constantly maintaining the hydraulic pressure of the pressure chamber 710 exerted on the drive pistons 712, 713.

If there is a drop in the braking effect at the time of the braking effect while the pressure chamber 710 is held in a sealed state, the anchor reaction force exerted on the control piston 722 via the lever member 725 is reduced. The control piston 723 is again protruded by the hydraulic pressure received from the master cylinder, and then the normally-open control valve 720 causes the fluid channel 718 to open again to thereby resume the supply of the hydraulic pressure to the pressure chamber 710.

As described above, since the control pistons 722, 723 control the supply of the hydraulic pressure to the pressure chamber 710 according to the anchor reaction force, the wheel cylinder can stably receive the anchor reaction force that is larger than the input from the master cylinder by a predetermined magnifying power.

The drum brake 701 in the third embodiment is basically a duo-servo type drum brake, and therefore the advantages of the duo-servo type drum brake; e.g., the advantages of a high degree of braking effect and easy incorporation of a parking brake, are ensured, exactly as they are.

In the thus-contrived wheel cylinder 705, when the anchor reaction force of the secondary shoe 704 becomes larger than the input from the master cylinder by a predetermined magnifying power, the control piston 722 that receives at the front end the anchor reaction force via the lever member 725 is displaced toward the control chamber 716, thereby closing the control valve 720 that opens/closes the fluid channel 718 connecting the master cylinder to the pressure chamber 710. As a result, the hydraulic pressure exerted on the pair of drive pistons 703, 704 that press the primary and secondary shoes 703, 704 is constantly held.

Accordingly, the anchor reaction force that is larger than the input by a predetermined magnifying power can be stably obtained, thereby eliminating the serious disadvantage of the existing duo-servo type drum brake; i.e., the disadvantage of instable braking effect.

If the hydraulic pressure within the pressure chamber 710 is increased by the control piston 722 for any reasons (e.g., vibrations of a drum, etc.) while the pressure chamber is held in a sealed state to thereby maintain the hydraulic pressure, and if the pressing pressure exerted on the brake shoes 703, 704 from the drive pistons 712, 713 is increased, the braking effect is increased, thereby resulting in so-called variations in the braking effect.

However, in the wheel cylinder 705 according to the present invention, if the hydraulic pressure within the pressure chamber 710 is increased by the control piston 722 for any reasons while the pressure chamber 710 is held in a sealed state to thereby maintain the hydraulic pressure, and if the pressing pressure exerted on the brake shoe 703 from the drive piston 712 is increased, the anchor reaction force exerted on the control piston 722 via the lever member 725 is also increased at the same time. As shown in FIG. 17, the control piston 722 is further pressed toward the control chamber 716, which in turn increases the volume of the auxiliary fluid chamber 747 communicated with the pressure chamber 710. An increase in the volume of the auxiliary fluid chamber 747 results in a substantial increase in the volume of the pressure chamber 710, thereby inhibiting an increase in the hydraulic pressure in the pressure chamber 710.

Accordingly, if the hydraulic pressure within the pressure chamber 710 is increased by vibrations of the drum, or the like, while the hydraulic pressure is held, such an increase in the hydraulic pressure is immediately suppressed by immediately response of the control piston 722, thereby preventing the disadvantage of so-called variations in braking effect and enabling stable braking effect.

Consequently, the drum brake according to the present invention provides a high degree of braking effect and realizes stable braking effect and easy incorporation of a parking brake. Miniaturization of a servo mechanism of the master cylinder enables a reduction in the size and cost of the brake.

In the foregoing construction, a servo ratio at which the control valve 720 is actuated can be set to an arbitrary value by changing the pressure-receiving areas of the control pistons 722, 723 facing the control chamber 716 and the ratio (so called as a leverage) between the levers 725 which transmit the anchor reaction force to the control pistons 722, 723. Therefore, engineering changes can be readily made to braking characteristics according to the type of a vehicle.

The levers 725 can input the anchor input received from the brake shoes to the respective control pistons 722, 723 after having considerably reduced the input. In other words, the pressure-receiving areas of the control pistons 722, 723 facing the control chamber 716 can be considerably reduced by setting the ratio (so called as a leverage) between the levers 725, as required. The miniaturization of the control pistons 722, 723 makes it possible to render the wheel cylinder 705 or more easily make the drum brake compact.

The end faces of the drive pistons 712, 713 for pressing the edges of the brake shoes 703, 704 via the anchor pins 715 are formed into plane surfaces. The contact between the anchor pin 715 and the drive piston 712 and the contact between the anchor pin 715 and the drive piston 713 are realized by combination of a circumferential surface and a plane surface. Therefore, torsional force is prevented from developing between the anchor pin 715 and the end face of the drive piston 712 and between the anchor pin 715 and the end face of the drive piston 713, thereby resulting in an improvement in the operation reliability of the drum brake.

Hereinafter, effects of the present invention is described.

Since a drum brake according to the present invention is basically a duo-servo type drum brake, the advantages of the duo-servo type drum brake; e.g., the advantages of a high degree of braking effect and easy incorporation of a parking brake, are ensured, exactly as they are.

A wheel cylinder that expands opposed ends at one longitudinal end of a pair of brake shoes at the time of braking effect is contrived in the following manner. More specifically, when the anchor reaction force of the secondary shoe becomes larger than an input from the master cylinder by a predetermined magnifying power, a control piston which receives at the front end the anchor reaction force, via a lever or a combination of the lever and a anchor pin, is displaced toward a second pressure chamber (or control chamber), thereby closing an input control valve which opens/closes a fluid channel connecting the master cylinder to a first pressure chamber (or simply a pressure chamber). As a result, the hydraulic pressure exerted on a pair of drive pistons which press the primary and secondary shoes is constantly held.

Accordingly, the anchor reaction force that is larger than the input by a predetermined magnifying power can be stably obtained, thereby eliminating the serious disadvantage of the existing duo-servo type drum brake; i.e., the disadvantage of instable braking effect.

Therefore, the duo-servo type drum brake provides a high degree of braking effect and realizes stable braking effect and easy incorporation of a parking brake. Miniaturization of a servomechanism of the master cylinder enables a reduction in the size and cost of the brake.

Further, in the drum brake according to the present invention, a servo ratio at which the input control valve is actuated can be set to an arbitrary value by changing the pressure-receiving areas of the control pistons facing the second pressure chamber and the ratio (so called as a leverage) between the levers which transmit the anchor reaction force to the control pistons. Therefore, engineering changes can be readily made to braking characteristics according to the type of a vehicle.

The levers are allowed to input the anchor input received from the brake shoes to the respective drive pistons after having considerably reduced it. In other words, the pressure-receiving areas of the control pistons facing the second pressure chamber can be considerably reduced by setting the ratio (so called as a leverage) between the levers, as required. The miniaturization of the control pistons makes it possible to render the wheel cylinder or the brake compact more readily.

In addition to the above-mentioned effects of the present invention, in the second aspect of the present invention, since it is constituted in such a manner that the end faces of the drive pistons for pressing the edges of the brake shoes via the anchor pins are formed into plane surfaces and that the contact between the anchor pin and the drive piston are realized by combination of a circumferential surface and a plane surface, so that torsional force can be prevented from developing between the anchor pin and the end face of the drive piston and between the anchor pin and the end face of the drive piston, thereby resulting in an improvement in operation reliability of the brake.

Hereinafter, specific effects, other than the abovementioned effects, obtained by the third aspect of the present invention will be described.

If the hydraulic pressure within the pressure chamber is increased by a control piston for any reasons (e.g., vibrations of a drum, etc.) while the pressure chamber is held in a sealed state to thereby maintain the hydraulic pressure, and if the pressing pressure exerted on the brake shoes from the drive pistons is increased, the braking effect is increased, thereby resulting in so-called variations in the braking effect.

However, in the wheel cylinder according to the third aspect of the present invention, if the hydraulic pressure within the pressure chamber is increased by the control piston for any reasons while the pressure chamber is held in a sealed state to thereby maintain the hydraulic pressure, and if the pressing pressure exerted on the brake shoe from the drive piston is increased, the anchor reaction force exerted on the control piston via the lever member is also increased at the same time. The control piston is further pressed toward the control chamber, which in turn increases the volume of an auxiliary fluid chamber communicated with the pressure chamber. An increase in the volume of the auxiliary fluid chamber results in a substantial increase in the volume of the pressure chamber, thereby inhibiting an increase in the hydraulic pressure in the pressure chamber.

Accordingly, if the hydraulic pressure within the pressure chamber is increased by vibrations of the drum, or the like, while the hydraulic pressure is held, such an increase in the hydraulic pressure is immediately suppressed by immediately response of the control piston, thereby preventing the disadvantage of so-called variations in braking effect and enabling stable braking effect.

Consequently, the drum brake according to the third aspect of the present invention provides a high degree of braking effect and realizes stable braking effect and easy incorporation of a parking brake. Miniaturization of a servomechanism of the master cylinder enables a reduction in the size and cost of the brake.

In the foregoing drum brake according to the present invention, a servo ratio at which the control valve is actuated can be set to an arbitrary value by changing the pressure-receiving areas of the control pistons facing the control chamber and the ratio (so called as a leverage) between the levers which transmit the anchor reaction force to the control pistons. Therefore, engineering changes can be readily made to braking characteristics according to the type of a vehicle.

While there has been described in connection with the preferred embodiments of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A duo-servo type drum brake including:
    a cylindrical drum;
    a pair of brake shoes including a primary shoe and a secondary shoe facing the primary shoe within the space of said cylindrical drum, each of the primary shoe and the secondary shoe including a first longitudinal end and a second longitudinal end;
    a wheel cylinder disposed between the first longitudinal ends of the primary shoe and the secondary shoe for expanding said brake shoes; and
    a link mechanism disposed between the second longitudinal ends of the primary shoe and the secondary shoe for transmitting an output of the primary shoe to the secondary shoe;
wherein said wheel cylinder further comprises:
    a wheel cylinder body:
    a first pressure chamber;
    a pair of drive pistons including a primary drive piston and a secondary drive piston, each having front ends and being opposite to each other with said first pressure chamber interposed therebetween, the primary drive piston pressing the first longitudinal end of the primary shoe, and the secondary drive piston pressing the first longitudinal end of the secondary shoe, in response to a first hydraulic pressure being supplied to said first pressure chamber;
    a second pressure chamber receiving a second hydraulic pressure supplied from a master cylinder;
    a fluid channel connecting said first pressure chamber and said second pressure chamber;
    a normally-open input control valve provided in said second pressure chamber for opening and closing the fluid channel;

a pair of control pistons including a primary control piston and a secondary control piston, each having a base end and a front end and being provided in parallel with said pair of drive pistons such that the base ends of said pair of control pistons are opposite to each other with said second pressure chamber interposed therebetween, said pair of control pistons being displaced toward said second pressure chamber so as to close the normally-open input control valve when a pressing force exerted on the front ends of said pair of control pistons becomes larger than the hydraulic pressure exerted on the base ends of said pair of control pistons by a predetermined magnifying power; and lever members, including a primary lever member and a secondary lever member, each having a first end and a second end, said primary lever member bridging the front ends of the primary drive piston and the primary control piston, and said secondary lever member bridging the front ends of the secondary drive piston and the secondary control piston to apply an anchor reaction force transmitted to said pair of drive pistons from the secondary shoe onto the front ends of said pair of control pistons after having reduced the anchor reaction force at a predetermined ratio.

2. The duo-servo type drum brake according to claim 1, further comprising:

a plane surface on the front end of each of said drive pistons, a circular-arch surface formed in the first longitudinal end of each of said pair of brake shoes, a pair of anchor pins including a primary anchor pin being sandwiched between the plane surface on the front end of the primary drive piston and the circular-arch surface formed in the first longitudinal end of the primary shoe for transmitting said pressing force therebetween, and a secondary anchor pin being sandwiched between the plane surface on the front end of the secondary drive piston and the circular-arch surface formed in the first longitudinal end of the secondary shoe for transmitting said pressing force therebetween, each of said anchor pins having a columnar shape and an axis aligned in the axial direction of said cylindrical drum.

3. The duo-servo type drum brake according to claim 2, wherein said second pressure chamber is positioned in the vicinity of the center of said cylindrical drum in relation to said first pressure chamber.

4. The duo-servo type drum brake according to claim 3, further comprising:

a hemispherically concave reaction force receiving portion at the first end of each of said lever members that contacts an outer peripheral surface of one of said pair of anchor pins acted upon by said anchor reaction force, a convexly curved section which is positioned on the outside of the hemispherically concave reaction force receiving portion of each of said lever members in the radial direction of said cylindrical drum and in rotatable contact with said wheel cylinder body to function as a fulcrum about which each of said lever members turns, and a reaction force output portion at the second end of each of said lever member, wherein said lever members transmit said anchor reaction force reduced by a predetermined ratio from the secondary shoe to the front ends of said pair of control pistons.

5. The duo-servo type drum brake according to claim 3, further comprising:

a hemispherically concave reaction force receiving portion at the first end of each of said lever members that contacts an outer peripheral surface of one of said pair of anchor pins acted upon by said anchor reaction force, a convexly curved section which is positioned on the opposite side of the hemispherically concave reaction force receiving portion of each of said lever members with respect to the second pressure chamber and in rotatable contact with said wheel cylinder body to function as a fulcrum about which each of said lever members turns, and a reaction force output portion at the second end of each of said lever member, wherein said lever members transmit said anchor reaction force reduced by a predetermined ratio from the secondary shoe to the front ends of said pair of control pistons.

6. The duo-servo type drum brake according to claim 4, wherein said wheel cylinder further comprises:

an auxiliary fluid chamber communicated with said first pressure chamber and formed around the outer peripheral surface of said pair of control pistons for opening and closing the control valve, said auxiliary fluid chamber being defined between a cylinder interior wall surface slidably supporting said pair of control pistons and the outer peripheral surface of said control pistons.

7. The duo-servo type drum brake according to claim 6, wherein said wheel cylinder further comprises:

a stepped section for further increasing the volume of said auxiliary fluid chamber when said control pistons are displaced toward said second pressure chamber.

8. A duo-servo type drum brake including:

a cylindrical drum;

a pair of brake shoes including a primary shoe and a secondary shoe facing the primary shoe within the space of said cylindrical drum, each of the primary shoe and the secondary shoe including a first longitudinal end and a second longitudinal end;

a wheel cylinder disposed between the first longitudinal ends of the primary shoe and the secondary shoe for expanding said pair of brake shoes;

a link mechanism disposed between the second longitudinal ends of the primary shoe and the secondary shoe for transmitting an output of the primary shoe to the secondary shoe;

wherein said wheel cylinder further comprises:

a wheel cylinder body, a first pressure chamber, a pair of drive pistons including a primary drive piston and a secondary drive piston, each having front ends being directed away from each other with said first pressure chamber interposed therebetween, the primary drive piston pressing the first longitudinal end of the primary shoe, and the secondary drive piston pressing the first longitudinal end of the secondary shoe, in response to a hydraulic pressure being supplied to said first pressure chamber, a second pressure chamber receiving a hydraulic pressure supplied from a master cylinder, a fluid channel connecting said first pressure chamber and said second pressure chamber, a normally-open input control valve provided in said second pressure chamber for opening and closing the fluid channel, a pair of control pistons including a primary control piston and a secondary control piston, each having a base end and a front end and being provided in parallel with said pair of drive pistons such that the base ends of said pair of control pistons are opposite to each other with said second pressure chamber interposed therebetween, said pair of control pistons being displaced toward said second pressure chamber so as to close the normally-open input control valve when a pressing force exerted on the front ends of said pair of control pistons becomes larger than a hydraulic pressure exerted on the base ends of said pair of control pistons by a predetermined magnifying power, and a plane surface on the front end of each of said pair of drive pistons;

lever members, including a primary lever member and a secondary lever member, each having a first end and a second end, said primary lever member bridging the front ends of the primary drive piston and the primary control piston, and said secondary lever member bridging the front ends of the secondary drive piston and the secondary control piston to apply an anchor reaction force transmitted to said pair of drive pistons from the secondary shoe onto the front ends of said pair of control pistons after having reduced the anchor reaction force at a predetermined ratio;

a circular-arch surface formed in the first longitudinal end of each of said pair of brake shoes;

a pair of anchor pins including a primary anchor pin being sandwiched between the plane surface on the front end of the primary drive piston and the circular-arch surface formed in the first longitudinal end of the primary shoe for transmitting said pressing force therebetween, and a secondary anchor pin being sandwiched between the plane surface on the front end of the secondary drive piston and the circular-arch surface formed in the first longitudinal end of the secondary shoe for transmitting said pressing force therebetween, each of said pair of anchor pins having a columnar shape and an axis aligned in the axial direction of said cylindrical drum;

a hemispherically concave reaction force receiving portion at the first end of each of said lever members that contacts an outer peripheral surface of one of said pair of anchor pins acted upon by said anchor reaction force;

a convexly curved section which is positioned on the outside of the hemispherically concave reaction force receiving portion of each of said lever members in the radial direction of said cylindrical drum and in rotatable contact with said wheel cylinder body to function as a fulcrum about which each of said lever members turns; and a reaction force output portion at the second end of each of said lever members; wherein said lever members transmit said anchor reaction force reduced by a predetermined ratio from the secondary shoe to the front ends of said pair of control pistons.

9. A duo-servo type drum brake including:

a cylindrical drum;

a pair of brake shoes including a primary shoe and a secondary shoe facing the primary shoe within the space of said cylindrical drum, each of the primary shoe and the secondary shoe including a first longitudinal end and a second longitudinal end;

a wheel cylinder disposed between the first longitudinal ends of the primary shoe and the secondary shoe for expanding said brake shoes;

a link mechanism disposed between the second longitudinal ends of the primary shoe and the secondary shoe for transmitting an output of the primary shoe to the secondary shoe;

wherein said wheel cylinder further comprises:

a wheel cylinder body, a first pressure chamber, a pair of drive pistons including a primary drive piston and a secondary drive piston, each having front ends being directed away from each other with said first pressure chamber interposed therebetween, the primary drive piston pressing the first longitudinal end of the primary shoe, and the secondary drive piston pressing the first longitudinal end of the secondary shoe, in response to a hydraulic pressure being supplied to said first pressure chamber, a second pressure chamber receiving a hydraulic pressure supplied from a master cylinder, a fluid channel connecting said first pressure chamber and said second pressure chamber, a normally-open input control valve provided in said second pressure chamber for opening and closing the fluid channel, a pair of control pistons including a primary control piston and a secondary control piston, each having a base end and a front end and being provided in parallel with said pair of drive pistons such that the base ends of said pair of control pistons are opposite to each other with said second pressure chamber interposed therebetween, said pair of control pistons being displaced toward said second pressure chamber so as to close the normally-open input control valve when a pressing force exerted on front ends of said control pistons becomes larger than the hydraulic pressure exerted on the base ends of said pair of control pistons by a predetermined magnifying power, and a plane surface on the front end of each of said drive pistons;

lever members, including a primary lever member and a secondary lever member, each having a first end and a second end, said primary lever member bridging the front ends of the primary drive piston and the primary control piston, and said secondary lever member bridging the front ends of the secondary drive piston and the secondary control piston to apply an anchor reaction force transmitted to said pair of drive pistons from the secondary shoe onto the front ends of said pair of control pistons after having reduced the anchor reaction force at a predetermined ratio;

a circular-arch surface formed in the first longitudinal end of each of said pair of brake shoes;

a pair of anchor pins including a primary anchor pin being sandwiched between the plane surface on the front end of the primary drive piston and the circular-arch surface formed in the first longitudinal end of the primary shoe for transmitting said pressing force therebetween, and a secondary anchor pin being sandwiched between the plane surface on the front end of the secondary drive piston and the circular-arch surface formed in the first longitudinal end of the secondary shoe for transmitting said pressing force therebetween, each of said anchor pins having a columnar shape and an axis aligned in the axial direction of said cylindrical drum;

a hemispherically concave reaction force receiving portion at the first end of each of said lever members that contacts an outer peripheral surface of one of said pair of anchor pins acted upon by said anchor reaction force;

a convexly curved section which is positioned on the opposite side of the hemispherically concave reaction force receiving portion of each of said lever members with respect to the second pressure chamber and in rotatable contact with said wheel cylinder body to function as a fulcrum about which each of said lever members turns;

a reaction force output portion at the second end of each of said lever members; wherein the lever members transmit said anchor reaction force reduced by a predetermined ratio from the secondary shoe to the front ends of said pair of control pistons;

an auxiliary fluid chamber communicated with said first pressure chamber and formed around the outer peripheral surface of said pair of control pistons for opening and closing the control valve, said auxiliary fluid chamber being defined between a cylinder interior wall surface slidably supporting said pair of control pistons and the outer peripheral surface of said pair of control pistons; and a stepped section for further increasing the volume of the auxiliary fluid chamber when said pair of control pistons are displaced toward the control chamber.

* * * * *